(12) United States Patent
Ahmed et al.

(10) Patent No.: US 12,537,360 B2
(45) Date of Patent: Jan. 27, 2026

(54) RADIATION FIELD GENERATING SYSTEM

(71) Applicant: Universitaet Stuttgart, Stuttgart (DE)

(72) Inventors: Marwan Abdou Ahmed, Stuttgart (DE); Frieder Beirow, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 994 days.

(21) Appl. No.: 17/654,288

(22) Filed: Mar. 10, 2022

(65) Prior Publication Data

US 2022/0294175 A1 Sep. 15, 2022

(30) Foreign Application Priority Data

Mar. 12, 2021 (EP) .................................... 21162382

(51) Int. Cl.
| | |
|---|---|
| *H01S 3/1115* | (2023.01) |
| *H01S 3/082* | (2006.01) |
| *H01S 3/10* | (2006.01) |
| *H01S 3/105* | (2006.01) |
| *H01S 3/106* | (2006.01) |
| *H01S 3/1118* | (2023.01) |

(52) U.S. Cl.
CPC .......... *H01S 3/1115* (2013.01); *H01S 3/0826* (2013.01); *H01S 3/10061* (2013.01); *H01S 3/1053* (2013.01); *H01S 3/1067* (2013.01); *H01S 3/1118* (2013.01)

(58) Field of Classification Search
CPC .. H01S 3/1115; H01S 3/1118; H01S 3/10061; H01S 3/1053; H01S 3/1067; H01S 3/0826
See application file for complete search history.

(56) References Cited

U.S. PATENT DOCUMENTS

| | | | | |
|---|---|---|---|---|
| 5,448,398 A | * | 9/1995 | Asakura | ............... G02B 5/1861 |
| | | | | 359/590 |
| RE47,818 E | * | 1/2020 | Almeida | ............. H01S 3/06754 |
| 2004/0190567 A1 | * | 9/2004 | Lutgen | .................... H01S 5/183 |
| | | | | 372/18 |
| 2006/0092994 A1 | | 5/2006 | Frankel et al. | |

OTHER PUBLICATIONS

Keller et al.; Semiconductor Saturable Absorber Mirrors (SESAM's) for Femtosecond to Nanosecond Pulse Generation in Solid-State Lasers; IEEE Journal of Selected Topics in Quantum Electronics, vol. 2, No. 3, Sep. 1996, pp. 435-453.

Beirow, et al.; Closed-loop controlled compensation of thermal lensing in high-power thin-disk lasers using spherically deformable mirrors; Laser Physics Letters 18 (2021) 025002, pp. 1-5.

(Continued)

*Primary Examiner* — James A Menefee
(74) *Attorney, Agent, or Firm* — Lipsitz & McAllister, LLC

(57) ABSTRACT

A radiation field generating system comprising an optical unit with an optical assembly which defines an optical path is provided, wherein the optical unit is operable in several different operation conditions and the optical assembly comprises at least one optical switching component with which switching between at least two different operation conditions of the several operation conditions can be performed.

33 Claims, 14 Drawing Sheets

(56) References Cited

OTHER PUBLICATIONS

Piehler, et al.; Power scaling of fundamental-mode thin-disk lasers using intracavity deformable mirrors; Optical Society of America, Optical Letters, vol. 37, No. 24, Dec. 15, 2012, pp. 5033-5035.
Piehler, et al.; Deformable mirrors for intra-cavity use in high-power thin-disk lasers; Optics Express, vol. 25, No. 4, Feb. 20, 2017, pp. 4254-4267.

* cited by examiner

RADIATION FIELD GENERATING SYSTEM

CROSS-REFERENCE TO RELATED PATENT APPLICATION

This patent application relates to the subject matter disclosed in and claims the benefit of European patent application number EP 21 162 382.2 filed on Mar. 12, 2021, the teachings and disclosure of which are hereby incorporated in their entirety by reference thereto for all purposes.

BACKGROUND OF THE INVENTION

The invention relates to a radiation field generating system, in particular for generating a radiation field and/or for amplifying a radiation field, for example a laser.

The problem underlying the invention is to improve a radiation field generating system.

SUMMARY OF THE INVENTION

According to one aspect of the invention this problem is solved by a radiation field generating system which comprises an optical unit with an optical assembly which defines an optical path, wherein the optical unit is operable in several different operation conditions and the optical assembly comprises at least one optical switching arrangement with which switching between at least two different operation conditions of the several operation conditions can be performed.

In particular, one advantage of the solution can be seen therein, that the optical unit is operable in several operation conditions, and therefore with the one optical unit different kinds of radiation fields can be provided depending on the operation condition the optical unit is operated in.

Advantageously, with this solution costs can be saved, because in embodiments thereof components for operating the optical unit, for example an amplifying component and/or elements of the optical assembly, are only needed once for the single unit and still different kinds of radiation fields according to the different several operation conditions are providable without having the need to have certain components several times for each optical unit providing only one of the several operation conditions.

For example, a setup for an application of the radiation field, in particular a laser, is simplified, because only the one system with the one optical unit is needed and still in the application the different kinds of radiation fields can be used. Accordingly, in the application there is no need to have several optical units each providing one of the several different kinds of radiation fields.

In particular, an advantage of the solution is, that the optical assembly comprises the at least one optical switching arrangement for switching between the at least two different operation conditions which enables the generation of at least two different kinds of radiation fields. This means in particular that a large part of the optical assembly and/or of the amplifying component, for example a laseractive medium and/or a pumping device and/or pumping source, can be used for generating at least two different radiation fields.

Accordingly, different kinds of radiation fields can be provided by the one optical unit and switching between different condition for providing different kinds of radiation fields can be achieved by switching the optics within the optical assembly.

With respect to the several operation conditions no further information have been given so far.

In particular, the several operation conditions are two different operation conditions or three different operation conditions or more than three different operation conditions.

In preferred embodiments, the several operation conditions comprise one pulsed operation condition or several pulsed operation conditions.

An advantage thereof is, that therewith the optical unit is operable in at least one pulsed operation condition, in which the optical unit provides a pulsed radiation field.

Different pulsed operation conditions are possible to be realized within the optical unit.

For example, at least one pulsed operation condition is configured for generating a radiation field with short pulses.

Above and in the following, short pulses are in particular pulses with a pulse duration in the nanosecond range or larger.

Above and in the following with the formulation of a pulse duration within the nanosecond range or larger it is in particular understood, that the respective generated pulses have a duration of at least approximately one nanosecond or larger.

For example the shortest possible duration of the short pulses is at least approximately between 100 microseconds and one nanosecond.

Preferably the shortest possible duration of short pulses is smaller than one microsecond and/or larger than at least approximately one nanosecond.

In advantageous embodiments, the several operation conditions comprise at least one pulsed operation condition which is configured for generating ultrashort pulses.

Above and in the following ultrashort pulses are in particular to be understood as pulses which have a pulse duration within the picosecond range and/or femtosecond range.

In particular, a pulse duration is to be understood to be in the picosecond range, if the duration of the respective generated pulses are at least approximately one picosecond or larger, for example their duration is at least approximately between 1 picosecond and 1.000 picoseconds.

For example, the shortest possible duration of ultrashort pulses is smaller than 500 picoseconds and with the pulsed operation condition for ultrashort pulses the optical unit is operable to provide ultrashort pulses with a duration of less than 500 picoseconds.

In particular, a pulse duration is to be understood to be in the femtosecond range, if the duration of the respective generated pulses are at least approximately one femtosecond or larger, for example their duration is at least approximately between 1 femtosecond and 1.000 femtoseconds.

In particular, within the pulsed operation condition for ultrashort pulses the optical unit is operable to provide ultrashort pulses with a pulse duration of less than 1 picosecond are generated.

Preferably, the several operation conditions comprise at least one mode-locked operation condition.

This is advantageous for having an operation condition for pulsed operation, in particular for generating ultrashort pulses.

In particular, in the mode-locked operation condition certain modes, in particular longitudinal modes, of a radiation field within the optical unit are locked in a fixed phase relationship to each other to form the pulses.

In particular, in the mode-locked operation the optical assembly provides a resonant cavity for the desired mode of operation and/or for example for a to be amplified mode.

For example, in the mode-locked operation the radiation field propagates within the optical assembly as a soliton.

For example, at least one pulsed operation condition is an active mode-locked operation condition.

In preferred embodiments, at least one pulsed operation condition is a passively mode-locked operation condition, which is particularly suitable for example for generating ultrashort pulses.

In advantageous embodiments, the several operation conditions comprise at least one continuous wave operation condition. Accordingly, within these embodiments, the optical unit is capable to operate to provide a continuous wave radiation field.

In preferred embodiments, the several operation conditions comprise at least one frequency conversion operation condition.

In particular, within such embodiments, the optical unit is operable in one or more frequency conversion operation conditions within which a frequency of at least a portion of a radiation field propagating within the optical unit is at least partially converted to another frequency.

For example in at least one frequency conversion operation the frequency of at least a portion of the radiation field is increased.

In some embodiments in at least one frequency conversion operation the frequency of at least a portion of the radiation field is decreased.

For example high harmonic generation, in particular frequency doubling, is used in at least one frequency conversion operation condition.

In some embodiments for example sum and/or difference frequency generation is used in at least one frequency conversion operation condition.

In some preferred embodiments, parametric oscillation and/or parametric amplification is used in at least one frequency conversion operation condition.

For example, in some embodiments Raman conversion is used in at least one frequency conversion operation condition.

In particular, one advantage thereof that the several operation conditions comprise at least one of a pulsed operation condition and/or at least one mode-locked operation condition and/or at least one continuous wave operation condition and/or at least one frequency conversion operation condition is that with one optical unit different kinds of radiation fields are providable, in particular on demand, and therefore the radiation field generating system provides a broad flexibility in applications since with the one optical unit the different kinds of radiation fields are providable.

Furthermore, for example with having implemented the several operation conditions within the one optical unit cost and space requirements can be reduced, because with the one optical unit the different radiation fields are providable and there is no need for a cumbersome and expensive setup of several optical units, providing the different kinds of radiation fields which in particular have each an optical assembly separated from each other. In particular, there is no need for several pumping devices and/or several laser amplifying components.

With respect to the optical switching arrangement no further details have been given so far.

In particular, the optical switching arrangement switches between the at least two different operation conditions based on at least one characteristic property of the radiation field propagating along the optical path.

Advantageously, therewith a constructive easy way to switch between the different operation conditions is provided.

Advantageously, the at least one characteristic property of the radiation field is one property or are several properties of at least a polarization of the radiation field and/or a property of a shape of the radiation field and/or a fluence of the radiation field.

In particular, the property of the shape of the radiation field is the dimension of the radiation field in a cross section at least approximately perpendicular to a propagation direction of the radiation field.

Preferably, the property of the shape is the beam diameter.

For example, the property of the shape of the radiation field is the intensity distribution of the radiation field along a direction which is at least approximately perpendicular to the propagation direction of the radiation field.

In some embodiments the radiation field caustic is the at least on characteristic property related to the shape of the radiation field.

In particular, the fluence of the radiation field is the energy of the radiation field per unit cross section of the shape of the radiation field. For example, the average energy and/or the peak energy and/or the energy per pulse is used for determining the fluence.

Preferably, the at least one switching arrangement comprises a setting device for setting the at least one characteristic property of the radiation field.

Advantageously, therewith at least one characteristic property, on which the switching between different operation conditions is performed is settable, in particular on demand settable as desired, for switching between the different operation conditions in the optical unit.

In some preferred embodiments, the setting device comprises one radiation field shaping element or several radiation field shaping elements.

In particular, at least one radiation field shaping element is an adaptable radiation field shaping element.

For example, the radiation field shaping element is adaptable under control of a controller and therefore on demand by a user and shapes the radiation field, in particular adapts at least the characteristic property of the shape, according differently on demand.

Advantageously, with the radiation field shaping element the shape of the radiation field, for example its dimension in a cross section and/or the beam diameter and/or the intensity distribution and/or another characteristic property of the shape, is to be shaped, in particular on demand, and in accordance with the shaped radiation field the switching arrangement switches between different operation conditions.

For example, at least one radiation field shaping element is a lens.

In preferred embodiments, at least one radiation field shaping element is a deformable mirror.

In some preferred embodiments, the setting device comprises at least one polarization switching element.

In particular, with the polarization switching element the polarization of the radiation field can be switched between at least two different polarizations and due to the switching arrangement the operation conditions are switched based on the set polarization.

In particular, at least one polarization switching element is a pockels cell.

In some preferred embodiments, at least one polarization switching element is a wave plate, in particular a half wave plate and/or quarter wave plate.

Advantageously, the at least one optical switching arrangement comprises at least one selective response device responding selectively on the radiation field, which is for example incident on the device and/or is penetrating the device, depending on the at least one characteristic property of the radiation field.

In particular, with that the optical switching arrangement has a device which responds selectively on the radiation field based on the at least one characteristic property and advantageously due to the selective response it is switched between the at least two different operation conditions.

In some advantageous embodiments, the at least one selective response device comprises at least one saturable absorber.

In particular, absorption losses within the saturable absorber depend on the fluence of the radiation field which is incident on and propagating through the saturable absorber medium of the saturable absorber. A larger fluence saturates the absorber and the losses therein are reduced for example up to some nonsaturable remaining losses.

In particular, the saturable absorber comprises an absorber medium with quantum well absorber.

In preferred embodiments, the saturable absorber is a semiconductor saturable absorber. This kind of saturable absorber is particularly preferred for mode-locked operation and/or ultrashort pulsed operation conditions to generate ultrashort pulses.

In advantageous embodiments, the saturable absorber is a saturable absorber mirror. In this case, in particular the reflectivity of the same depends on the fluence of the incident radiation field.

Advantageously, the saturable absorber is a semiconductor saturable absorber mirror (SESAM).

For example, one advantage of above-mentioned embodiments is that with a saturable absorber the switching arrangement is sensitive on the fluence of the radiation field and is enabled to switch between different operation conditions based on the fluence of the radiation field, in particular by employing the saturation of the absorption losses.

In particular, with the selective response device comprising a saturable absorber between a mode-locked operation condition and/or pulsed operation condition in particular for ultrashort pulses on the one hand and another operation condition, for example continuous wave operation condition, can be switched.

In preferred embodiments, the fluence of the radiation field is indirectly set within the switching arrangement by using a radiation field shaping element, in particular as described above. For example the fluence is set by the radiation field shaping element through widening and narrowing the dimension of the radiation field and/or through changing another characteristic property of the shape.

In some advantageous embodiments the at least one selective response device comprises at least one deflection element.

In particular, with the deflection element the switching arrangement is capable of providing different operation conditions depending on the selective deflection properties of the deflection element and/or the selectively adjusted deflection arrangement.

For example, the radiation field propagates depending on the selective deflection along different arms of the optical path and therefore different operation conditions are provided.

Preferably, the at least one deflection element deflects the radiation field depending on the at least one characteristic property of the radiation field into different directions, in particular into different arms of the optical path.

Accordingly, in particular the deflection element is therefore selectively responding to the characteristic property of the radiation field in that it differently redirects the radiation field depending on the characteristic property, and therefore different operation conditions are realized.

In advantageous embodiments, the at least one characteristic property depending on which the deflection element deflects the radiation field is one or are several of above-mentioned characteristic properties.

In some preferred embodiments, the deflection element is selective to the polarization of the radiation field and deflects the radiation field depending on the polarization of the radiation field incident on the deflection element.

For example, in some advantageous embodiments the deflection element is a diffraction mirror.

In particular, with that a constructive simple solution for selectively responding to a characteristic property of the radiation field, for example its polarization, is provided, and with a diffraction mirror a redirection of the radiation field for example in different diffraction orders is realized in a constructively simple manner.

In particular advantageous embodiments, the at least one deflection element, for example the diffraction mirror, is used in Littrow condition.

Further details about the realization of the different operation conditions within the optical unit have not been given so far.

In particular, the optical path within the optical unit defined by the optical assembly has one single arm or bifurcates within the optical unit in two or more arms.

Within the context of this application an arm of the optical path is in particular to be understood to be a part of the optical path between two neighboring bifurcations of the same as an intermediate arm or an end arm running from a bifurcation and having in particular a reflective element or an outcoupling element at its other end.

Within the context of this application, within one arm of the optical path there can be different optical elements, which for example shape or redirect the radiation field, but at which the optical path does not bifurcate. In particular, an extension of an arm between two different optical elements is called a section of the optical path, in particular a section of the arm.

In particular, the optical assembly comprises for each bifurcation of the optical path within the optical unit an optical switching arrangement, in particular comprising a deflection element, with which the propagation of the radiation field can be directed to a respective arm at that bifurcation.

In particular, the optical assembly comprises at least one outcoupling elements. In particular, at least a portion of the radiation field is coupled out of the optical unit at the outcoupling element and therefore at the outcoupling element the optical path within the optical unit is connected to an outgoing optical path, which runs out of the optical unit.

In particular, the optical path comprises one main arm along which the radiation field propagates for each of the several operation conditions.

In some advantageous embodiments, along the main arm at least one operation condition of the several operation conditions is realized.

That is in particular, that elements of the optical assembly and for example further elements of the optical unit are provided and configured along the main arm for the at least one operation condition.

For example, the at least one operation condition realized along the main arm is a continuous wave operation.

In some preferred embodiments, alternatively or in addition, along the main arm at least one pulsed operation condition, in particular for providing short pulses, is realized.

In some advantageous embodiments, alternatively or in addition, along the main arm at least one pulsed operation condition, in particular for providing ultrashort pulses, is realized.

Preferably, for configuring the main arm to provide pulsed operation condition a pulse generating device and/or a setting device with a radiation field shaping element is provided within the main arm.

For example, the main arm is defined between two, in particular at least partly reflecting, end elements.

In particular, one of the two end elements of the main arm is the outcoupling element.

For example, one of the two end elements of the main arm is an end mirror.

In some preferred embodiments, one of the two end elements of the main arm is a saturable absorber mirror.

In particular, therewith along the main arm a pulsed operation condition, in particular for ultrashort pulses, and/or a continuous wave operation condition can be realized.

In some advantageous embodiments, one of the two end elements in the deflection element or one of several deflection elements.

In particular, with the deflection element the main arm is connected to several supplementary arms along which different operation conditions are realized.

In some advantageous embodiments, the optical path comprises within the optical unit only one single arm.

For example, there with a complexity within the optical assembly is insofar reduced, as the optical path does not bifurcate and therefore in particular several arms of the optical path need not to be adjusted relative to each other.

In particular, this provides for a compact solution, because installation space is saved since within the single arm the different operation conditions are realized and the one optical unit is operable to provide different kinds of radiation fields according to the several operation conditions.

In particular, along the one single arm the several different operation conditions are realized.

In particular, the one single arm is in these embodiments also the main arm.

In particular, this single arm is the main arm.

For these embodiments with a single arm it is particularly advantageous, if the at least one optical switching arrangement comprises a saturable absorber as described above.

In other preferred embodiments, the optical path comprises several arms.

In particular, along the several arms different operation conditions are realized and with the switching arrangement it is switched between the several arms to operate the optical unit in the different corresponding operations.

Preferably, along at least two different arms of the optical path at least two different operation conditions are realized within the optical unit.

Accordingly, along at least one arm at least one operation condition is realized and along another arm at least one other operation condition is realized therefore the optical unit is operable in several operation conditions.

In particular, along the different arms the different operation conditions are realized in that respective elements of the optical assembly and for example other elements of the optical unit are provided and configured along the different arms.

Preferably, the radiation field is directed into the respective arm with the desired operation condition the one deflection element or by several deflection elements.

Preferably, the switching between the different arms is achieved by setting the at least one characteristic property of the radiation field, in particular with the at least one setting device.

The optical path comprises in particular at least one supplementary arm bifurcating from the main arm and preferably along the at least one supplementary arm at least one of the several operation conditions is realized.

In some advantageous embodiments the optical path comprises the main arm and one supplementary arm bifurcating from the main arm.

In other preferred embodiments, several supplementary arms bifurcate from the main arm.

In some advantageous embodiments, along the main arm at least one of the several operation conditions is realized and along at least one supplementary arm, in particular along the one supplementary arm, at least one other operation condition is realized.

Advantageously, therewith a switching between the at least two different operation conditions is achieved with a switching arrangement comprising at least one deflection element and depending on the at least one characteristic property the propagating radiation field is kept within the main arm for providing the at least one operation condition thereof or is deflected to the at least one supplementary arm for providing the at least one other operation condition of that supplementary arm.

For example along the main arm at least continuous wave operation conditions are realized and along the at least one supplementary arm pulsed operation conditions, in particular for ultra-short pulses are realized.

In other advantageous embodiments, at least two supplementary arms bifurcate from the main arm and along the at least two supplementary arms different operation conditions are realized.

For example that provides the advantage, to keep the complexity within the several arms relatively low, because specific elements for a certain operation condition are only in the respective arm.

In particular, a quality of the radiation field can be increased, because specific elements for providing a certain operation condition are only in a respective supplementary arm and accordingly do not adversely affect an operation under other conditions realized along another supplementary arm.

In some preferred embodiments, at least one supplementary arm bifurcates in another supplementary arm or in several other supplementary arms.

It is particularly advantageous, to connect supplementary arms configured for similar operation conditions together.

For example, a supplementary arm configured for continuous wave operation condition bifurcates to another supplementary arm configured for frequency conversion operation condition.

In some preferred embodiments, one supplementary arm is configured for continuous wave operation condition and pulsed operation condition for short pulses.

For example, this is suitable, since for example for the generation of short pulses a pulse generating component, for example an accusto-optic modulator and/or electro-optic modulator are used, which do not or at least not strongly adversely affect the continuous wave operation condition.

In other advantageous embodiments from a supplementary arm configured for continuous wave operation condition a supplementary arm configured for pulsed operation condition for short pulses bifurcates.

In some advantageous embodiments, one supplementary arm is configured for pulsed operation conditions for ultrashort pulses and another supplementary arm is configured for continuous wave operation conditions and/or pulsed operation condition for short pulses.

One advantage thereof is for example, that the operation condition for short pulses is realized in another supplementary arm than the operation condition for ultrashort pulses and therefor in particular the optical components for generating the short pulses do not adversely affect the generation of ultrashort pulses in the other supplementary arm.

In some advantageous embodiments, along at least on arm, for example the main arm or a supplementary arm, at least two different operation conditions are realized.

In particular, therewith the complexity of the optical path is not getting too complex.

In some preferred embodiments, the optical path within the optical unit comprises for each respective operation condition a respective supplementary arm.

This provides for example the advantage, that the optical components for configuring each of the respective operation conditions do not adversely affect the operation in another operation condition.

No further details about optical elements and/or optical components of the optical assembly and the configuration thereof for the several operation conditions have been given so far.

In particular, the optical assembly comprises one pulse generating component or several pulse generating components.

In preferred embodiments, the optical assembly comprises at least one pulse generating component which is configured for generating ultrashort pulses.

Accordingly, this provides in particular the advantage, that the optical unit is operable within a pulsed operation condition for providing a radiation field of ultrashort pulses.

There are different pulse generating components for generating ultrashort pulses available and can be used within the optical unit according to the present embodiments.

For example, the pulse generating component configured for ultrashort pulses comprises a saturable absorber.

In particular, the saturable absorber is a semiconductor saturable absorber.

In some preferred embodiments, the saturable absorber is configured as saturable absorber mirror, for example as a semiconductor saturable absorber mirror.

In some preferred embodiments, the selective response device comprises at least one pulse generating component.

In particular, the pulse generating component of the selective response device is configured for ultrashort pulses.

For example, the pulse generating component of the selective response device comprises a saturable absorber, as described above.

This provides for example for a component saving solution, because with the selective response device between different operation conditions, in particular a continuous wave operation condition and a pulsed operation condition, in particular for ultrashort pulses, can be switched.

For this embodiment, the selective response device is in particular selectively responding to a characteristic property of the radiation field as described above.

In preferred embodiments of this kind the characteristic property is in particular the fluence and/or the characteristic property of the shape of the radiation field.

In some advantageous embodiments, the optical assembly comprises at least one pulse generating component which is configured for generating short pulses.

There are different pulse generating components for generating short pulses available and these can be used in the embodiments of the present invention.

For example, the pulse generating component for short pulses is an accousto-optic modulator or an electro-optic modulator.

In some preferred embodiments, the pulse generating component for short pulses is provided in an arm of the optical path which is configured for continuous wave operation condition and pulsed operation condition.

Advantageously, the at least one pulse generating component for generating ultrashort pulses and the at least one pulse generating component for generating short pulses are provided in different arms of the optical path, in particular in different supplementary arms of the optical path.

In particular, with this solution the different pulse generating components do not adversely interfere with the pulsed radiation field provided by the other pulse generating component.

In some advantageous embodiments, the radiation field generating system comprises a frequency conversion device, in particular to realize frequency conversion operation condition.

This allows the system to provide radiation fields with different wave lengths.

For example, the frequency conversion device is designed to provide a radiation field in the ultraviolet range.

In other embodiments the frequency conversion device is designed to provide a radiation field in the infrared range.

For example, in some embodiments the frequency conversion device is designed configured to provide a frequency converted radiation field in the visible light range.

In some advantageous embodiments, the frequency conversion device is provided outside of the optical unit.

In particular, the radiation field provided by the optical unit is, for example along the outgoing optical path, provided to the frequency conversion device.

For example, with this arrangement different kinds of radiation fields as provided by the optical unit in the several operation conditions are available for the frequency conversion.

In some preferred embodiments, the optical unit comprises the frequency conversion device.

In particular, therewith the optical unit is configured for operating in frequency conversion operation conditions.

Preferably, the frequency conversion device is provided in a supplementary arm.

For example an advantage thereof is, that other operation conditions, for example pulsed operation conditions for ultrashort pulses, are thereby not adversely affected by the frequency conversion device, which is provided in a separate supplementary arm.

In particular, the optical assembly comprises an outcoupling element for coupling out a frequency converted portion of the radiation field. Accordingly, at this outcoupling element the optical path within the optical unit is connected to an outgoing optical path for the frequency converted portion of the radiation field.

Preferably, the optical unit comprises a laser amplifying component.

In particular, therewith the radiation field within the optical unit is amplified.

Advantageously, the optical unit comprises one and only one laser amplifying component.

Preferably, the laser amplifying component is provided in the main arm of the optical path.

In particular, the laser amplifying component comprises a laser active medium.

The laser active medium is provided in the optical path and therefore the radiation field propagating in the optical unit is getting amplified by penetrating the laser active medium.

Advantageously, the laser amplifying component comprises a pumping device. In particular, with the pumping device pumping energy is provided to the laser active medium for amplifying the radiation field.

In particular, the pumping device pumps the laser active medium optically or electrically.

For example, the pumping device comprises a source for a seed laser.

Preferably, the optical unit is built as a resonator.

Advantageously, the optical assembly provides, in particular in all of the several operation conditions, for a laser cavity for the radiation field propagating within the optical unit.

In particular, the optical elements of the optical assembly are arranged such that in the several operation conditions the respective modes of the radiation field are oscillating and resonant within the cavity.

In some advantageous embodiments, the optical assembly comprises an optical compensation arrangement.

In particular, the optical compensation arrangement comprises one or several optical elements.

Preferably, the optical compensation arrangement compensates for changing settings along a part of the optical path, for example due to the switching arrangement and/or different settings along different supplementary arms.

For example, the optical compensation arrangement is configured to provide uniform conditions along at least a part of the optical path, in particular resonant conditions for at least certain modes of the radiation field.

Accordingly, with the optical compensation arrangement preferably different settings for one or several operation conditions, for example the propagation of the radiation field along different supplementary arms and/or different settings in the optical switching arrangement, are compensated, such that for example still the conditions for amplifying certain modes in the laser cavity are provided for each of the several operation conditions.

In particular, with the optical compensation arrangement an at least with respect to its shape uniform radiation field is provided along at least a part of the optical path, in particular at least to the section of the optical path in which the laser amplifying component is provided.

In particular with this arrangement a uniform and/or steady amplification of the radiation field is achieved.

In particular, the optical compensation arrangement is configured to compensate for changes in the shape of the radiation field which are for example provided by the optical switching arrangement.

Preferably, the optical compensation arrangement comprises one radiation field shaping element or several radiation field shaping elements.

In particular, at least one radiation field shaping element is an adaptable radiation field shaping element.

For example at least one radiation field shaping element is a lens.

Preferably, at least one radiation field shaping element is a deformable mirror.

In particular, one or several deformable mirrors are spherically deformable mirrors.

For example, the above-mentioned compensation of different settings and/or provision of a uniform radiation field is achieved by adapting the beam shaping elements accordingly.

Advantageously, the optical compensation arrangement is arranged within the main arm.

In some preferred embodiments, the optical switching arrangement and the optical compensation arrangement are integrated in one optical adjustment component.

In particular, this is advantageous if the switching arrangement comprises the setting device, for example for setting the shape of the radiation field as the characteristic property, such that with the adjustment component the characteristic property is on one hand set for the selective response device but on the other hand the radiation field is provided at least essentially uniform along the remaining part of the optical path, for example to achieve resonant conditions in the optical unit and/or an uniform radiation field at the amplifying component.

For example, the optical adjustment component comprises and/or is built by at least two deformable mirrors, which in particular built an adaptive telescope.

In preferred embodiments, the optical unit comprises a controller for controlling the unit and its operation.

For example, the controller controls optical arrangements and/or devices and/or components and/or elements of the optical unit.

In particular, the controller comprises a user interface. With the user interface a user is capable to input a desired operation condition and/or a sequence of desired operation conditions.

Therewith, the different operation conditions are selectable on demand.

In some advantageous embodiments, the radiation field generating system comprises at least one amplifying unit in addition to the optical unit.

For example, the amplifying unit is a laser amplifier.

In some preferred embodiments, the amplifying unit is a cascade of laser amplifiers.

In particular, the amplifying unit comprises at least one of thin disk amplifier and/or a slab amplifier and/or a fiber amplifier.

For example, one advantage thereof is that with the one optical unit and the amplifying unit different kinds of radiation fields according to the several operation conditions can be provided and amplified and supplied to a specific use of the radiation field.

Another aspect of the invention relates to a production machine, in particular a machine for material processing.

The underlying problem is to improve a production machine and/or a machine for material processing.

According to the invention this problem is solved by a production machine which comprises a radiation field generating system with one or several features as described above.

In particular, an advantage thereof is that with the radiation field generating system different kinds of radiation fields, in particular continuous wave lasers and/or short pulsed lasers and/or ultrashort pulsed lasers, are provided and can be used in the machine for in particular material processing.

Above mentioned advantages, for example cost reductions and/or simplifications of installation setup, transfer analogously to advantages for the machine.

In particular, the machine is capable, in particular with the lasers provided by the radiation field generating system, from micro processing with high precision and high productivity to macro material processing.

For example material processing comprises one or several of at least cutting and/or welding and/or drilling and/or surface finishing and/or material deposition and/or micro and nanostructuring and/or joining processes and/or heat treatments and/or chemical reaction controlling and processing.

In the context of this application document the use of the phrases in particular, for example, advantageously, preferably and so forth in connection with features and/or elements are to be understood to provide for optional features and elements of the invention, which for example provide additional advantages and/or benefits, but which are not essential for the disclosed invention.

Before and in the following the term "at least approximately" in connection with a feature, in particular with a value, is to be understood in particular that technically conditioned and/or technically irrelevant variations to the feature, in particular to the value, are also comprised. For example, variations to a given value of up to 30%, in particular up to 10%, preferably up to 2%, advantageously up to 0.5%, for example up to 0.1%, are comprised by a value given at least approximately.

The solutions in accordance with the present invention comprise, in particular, the combinations of features defined by the following embodiments numbered consecutively.

1. Radiation field generating system (100, 100a, 100b, 100c) comprising an optical unit (110, 110a, 110b, 110c) with an optical assembly (112, 112a, 112b, 112c) which defines an optical path (114, 114a, 114b, 114c), wherein the optical unit (110, 110a, 110b, 110c) is operable in several different operation conditions and the optical assembly (112, 112a, 112b, 112c) comprises at least one optical switching component (150, 150a, 150b, 150c, 250c) with which switching between at least two different operation conditions of the several operation conditions can be performed.
2. Radiation field generating system (100, 100a, 100b, 100c) according to embodiment one, wherein the several operation conditions comprise one pulsed operation condition or several pulsed operation conditions.
3. Radiation field generating system (100, 100a, 100b, 100c) according to one of the preceding embodiments, wherein the several operation conditions comprise at least one pulsed operation condition which is configured to generate ultra-short pulses.
4. Radiation field generating system (100, 100a, 100b, 100c) according to one of the preceding embodiments, wherein the several operation conditions comprise at least one mode-locked operation condition.
5. Radiation field generating system (100, 100a, 100b, 100c) according to one of the preceding embodiments, wherein the several operation conditions comprise at least one continuous wave operation condition.
6. Radiation field generating system (100, 100a, 100b, 100c) according to one of the preceding embodiments, wherein the several operation conditions comprise at least one frequency conversion operation condition.
7. Radiation field generating system (100, 100a, 100b, 100c) according to one of the preceding embodiments, wherein the at least one optical switching component (150, 150a, 150b, 150c, 250c) switches between the at least two different operation conditions based on at least one characteristic property of the radiation field which propagates along the optical path.
8. Radiation field generating system (100, 100a, 100b, 100c) according to the preceding embodiment, wherein the at least one characteristic property of the radiation field is one property or are several properties of at least a polarization and/or a property of a shape and/or a fluence of the radiation field.
9. Radiation field generating system (100, 100a, 100b, 100c) according to one of the preceding embodiments, wherein the at least one switching component (150, 150a, 150b, 150c, 250c) comprises a setting device (144, 144a, 144b, 144c) for setting the at least one characteristic property of the radiation field.
10. Radiation field generating system (100, 100a, 100b, 100c) according to the preceding embodiment, wherein the setting device (144, 144a, 144b, 144c) comprises one radiation field shaping element or several radiation field shaping elements.
11. Radiation field generating system (100, 100a, 100b, 100c) according to the previous embodiment, wherein at least one radiation field shaping element of the setting device (144, 144a, 144b, 144c) is an adaptable radiation field shaping element, in particular a deformable mirror (156).
12. Radiation field generating system (100, 100a, 100b, 100c) according to one of the three preceding embodiments, wherein the setting device (144, 144a, 144b, 144c) comprises at least one polarization switching element.
13. Radiation field generating system (100, 100a, 100b, 100c) according to one of the preceding embodiments, wherein the at least one optical switching component (150, 150a, 150b, 150c, 250c) comprises at least one selective response device (142, 142a, 142b, 142c) responding selectively on the radiation field depending on the at least one characteristic property of the radiation field.
14. Radiation field generating system (100, 100a, 100b, 100c) according to the preceding embodiment, wherein the at least one selective response device (142, 142a, 142b, 142c) comprises at least one saturable absorber.
15. Radiation field generating system (100, 100a, 100b, 100c) according to one of the two preceding embodiments, wherein the at least one selective response device (142, 142a, 142b, 142c) comprises at least one deflection element (212).
16. Radiation field generating system (100, 100a, 100b, 100c) according to the preceding embodiment, wherein the at least one deflection element (212) deflects the radiation field depending on the at least one characteristic property of the radiation field into different directions.
17. Radiation field generating system (100, 100a, 100b, 100c) according to one of the two preceding embodiments, wherein the at least one deflection element (212) is a diffraction mirror.
18. Radiation field generating system (100, 100a, 100b, 100c) according to one of the three preceding embodiments, wherein the at least one deflection element (212) is used in Littrow condition.
19. Radiation field generating system (100, 100a, 100b, 100c) according to one of the preceding embodiments, wherein the optical path (114, 114a, 114b, 114c) within the optical unit (110, 110a, 110b, 110c) has one single arm (172) or bifurcates within the optical unit (110, 110a, 110b, 110c) in two or more arms (172, 172a, 172b, 172c, 222, 242, 244, 262, 264).

20. Radiation field generating system (100, 100a, 100b, 100c) according to one of the preceding embodiments, wherein the optical path (114, 114a, 114b, 114c) comprises a main arm (172, 172a, 172b, 172c) along which the radiation field propagates for each of the several operation conditions.
21. Radiation field generating system (100, 100a, 100b, 100c) according to the preceding embodiment, wherein along the main arm (172, 172a, 172b, 172c) at least one of the several operation conditions is realized, in particular at least a continuous wave operation condition and/or a pulsed operation condition.
22. Radiation field generating system (100, 100a, 100b, 100c) according to one of the preceding embodiments, wherein the optical path (114, 114a, 114b, 114c) comprises within the optical unit (110, 110a, 110b, 110c) a single arm, along which the several operation conditions are realized.
23. Radiation field generating system (100, 100a, 100b, 100c) according to one of the embodiments 1 to 21, wherein along at least two different arms (172, 172a, 172b, 172c, 222, 242, 244, 262, 264) of the optical path (114, 114a, 114b, 114c) at least two different operation conditions are realized within the optical unit (110, 110a, 110b, 110c).
24. Radiation field generating system (100, 100a, 100b, 100c) according to one of the preceding embodiments except for embodiment 22, wherein the optical path (114, 114a, 114b, 114c) comprises at least one supplementary arm (222, 242, 244, 262, 264) bifurcating from the main arm (172, 172a, 172b, 172c) and along the at least one supplementary arm (222, 242, 244, 262, 264) at least one of the several operation conditions is realized.
25. Radiation field generating system (100, 100a, 100b, 100c) according to one of the preceding embodiments except for embodiment 22, wherein at least one supplementary arm (222, 242, 244, 262, 264) bifurcates in another supplementary arm (222, 242, 244, 262, 264).
26. Radiation field generating system (100, 100a, 100b, 100c) according to one of the preceding embodiments, wherein along at least one arm (172, 172a, 172b, 172c, 222, 242, 244, 262, 264) at least two different operation conditions are realized.
27. Radiation field generating system (100, 100a, 100b, 100c) according to one of the preceding embodiments except for embodiment 22, wherein the optical path (114, 114a, 114b, 114c) within the optical unit (110, 110a, 110b, 110c) comprises for each respective operation condition a respective supplementary arm.
28. Radiation field generating system (100, 100a, 100b, 100c) according to one of the preceding embodiments, wherein the optical assembly (112, 112a, 112b, 112c) comprises one pulse generating component or several pulse generating components.
29. Radiation field generating system (100, 100a, 100b, 100c) according to one of the preceding embodiments, wherein the optical assembly (112, 112a, 112b, 112c) comprises at least one pulse generating component which is configured for generating ultrashort pulses.
30. Radiation field generating system (100, 100a, 100b, 100c) according to one of the preceding embodiments, wherein the selective response device (142) comprises at least one pulse generating component.
31. Radiation field generating system (100, 100a, 100b, 100c) according to one of the preceding embodiments, wherein the optical assembly (112, 112a, 112b, 112c) comprises at least one pulse generating component which is configured for generating short pulses.
32. Radiation field generating system (100, 100a, 100b, 100c) according to one of the preceding embodiments, wherein the at least one pulse generating component for generating ultrashort pulses and the at least one pulse generating component for generating short pulses are provided in different arms of the optical path (114, 114a, 114b, 114c).
33. Radiation field generating system (100, 100a, 100b, 100c) according to one of the preceding embodiments, wherein the optical unit (110, 110a, 110b, 110c) comprises at least one frequency conversion device (266).
34. Radiation field generating system (100, 100a, 100b, 100c) according to one of the preceding embodiments, wherein the optical unit (110, 110a, 110b, 110c) comprises a laser amplifying component (121).
35. Radiation field generating system (100, 100a, 100b, 100c) according to one of the preceding embodiments, wherein the optical unit (110, 110a, 110b, 110c) is built as a resonator.
36. Radiation field generating system (100, 100a, 100b, 100c) according to one of the preceding embodiments, wherein the optical assembly (112, 112a, 112b, 112c) comprises an optical compensation arrangement (170) in particular to provide at least with respect to resonant conditions for certain modes of the radiation field uniform conditions along at least a part of the optical path (114, 114a, 114b, 114c) and/or to provide an at least with respect to its shape uniform radiation field along at least a part of the optical path (114, 114a, 114b, 114c).
37. Radiation field generating system (100, 100a, 100b, 100c) according to the preceding embodiments, wherein the optical compensation arrangement (170) comprises one radiation field shaping element (166) or several radiation field shaping elements (166).
38. Radiation field generating system (100, 100a, 100b, 100c) according to one of the two preceding embodiment, wherein the optical compensation arrangement (170) comprises at least one adaptable radiation field shaping element (166), in particular at least one deformable mirror.
39. Radiation field generating system (100, 100a, 100b, 100c) according to one of the three preceding embodiments, wherein the optical switching arrangement (150, 150a, 150b, 150c, 250c) and the optical compensation arrangement (170) are integrated in one optical adjustment component.
40. Radiation field generating system (100, 100a, 100b, 100c) according to one of the preceding embodiments, wherein the radiation field generating system comprises at least one amplifying unit (192) in addition to the optical unit (110, 110a, 110b, 110c).
41. Production machine, in particular for material processing, comprising a radiation field generating system (100, 100a, 100b, 100c) according to one of the preceding embodiments.

Further explanations and preferred features with respect to the present invention are provided in connection with the detailed specification and the drawings.

DETAILED DESCRIPTION OF THE INVENTION

Figure 1:
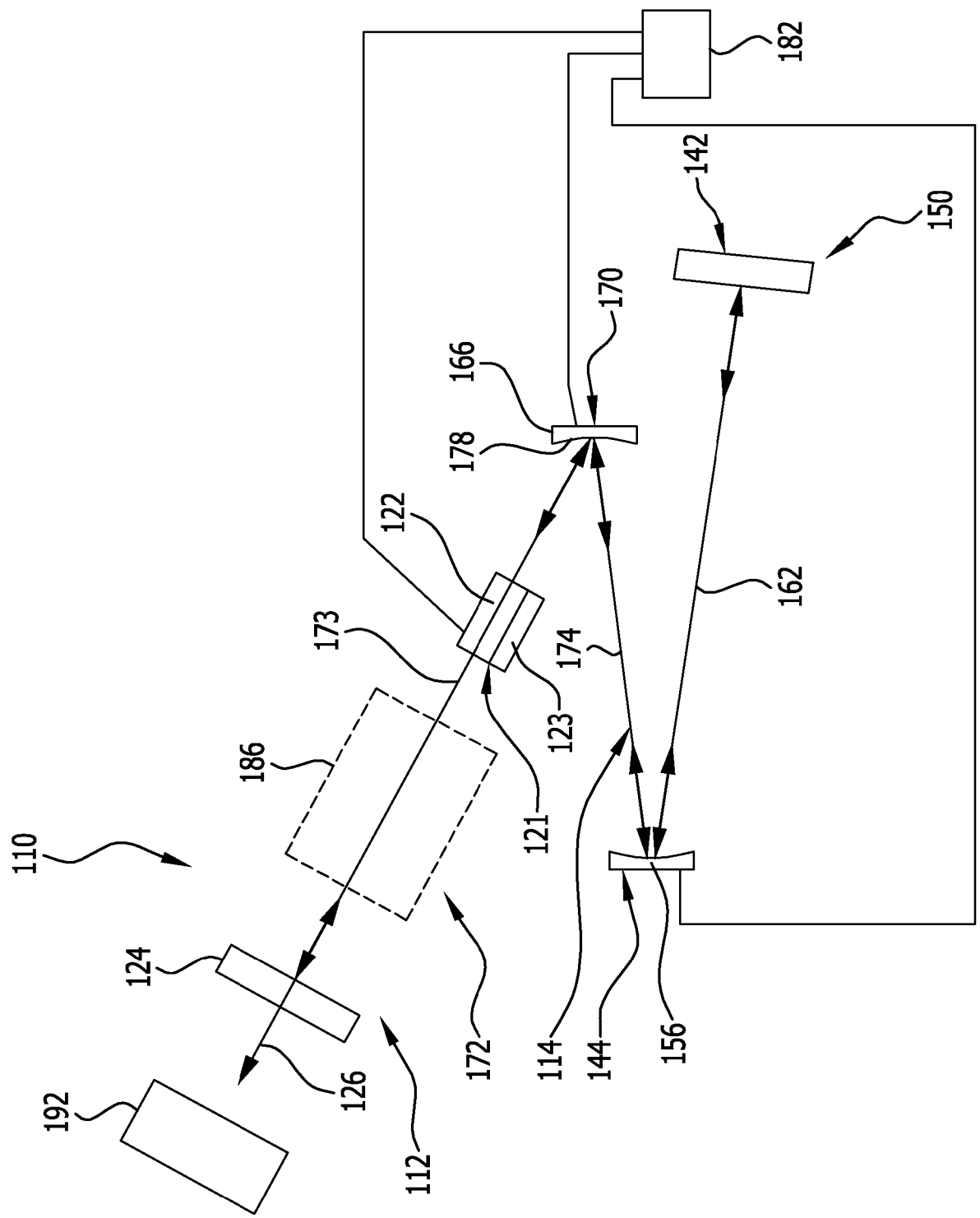
FIG. 1 shows an embodiment of a radiation field generating system comprising an optical unit which is operable in several operation conditions.

A first embodiment of a radiation field generating system comprises an optical unit which as a whole is designated with 110 and exemplarily shown in FIG. 1.

The optical unit 110 comprises an optical assembly 112 of several optical elements and which defines an optical path 114 within the optical unit 110.

Advantageously, the optical assembly 112 forms a laser cavity for a radiation field.

Preferably, the optical unit 110 is designed as a resonator for the radiation field and comprises a laser amplifying component 121 with a laser active medium 122 through which the optical path 114 runs.

In particular, the laser amplifying component 121 further comprises a pumping assembly 123 to provide pumping energy to the laser active medium 122, such that a radiation field propagating through the laser active medium 122 is amplified.

The optical assembly 123 comprises an out coupling element 124, for example a partially reflecting mirror. At outcoupling element 124 a part of the radiation field, which propagates within the optical unit 100, is coupled out of the unit 110 to an outgoing optical path 126 and the other part of, in particular most of, the radiation field is kept within the optical unit 110 along the optical path 114.

Furthermore, the optical assembly 112 comprises an optical switching arrangement 150 with a selective response device 142 which is selectively responding to a characterizing property of the radiation field and a setting device 144 for setting this characterizing property.

Figure 2:
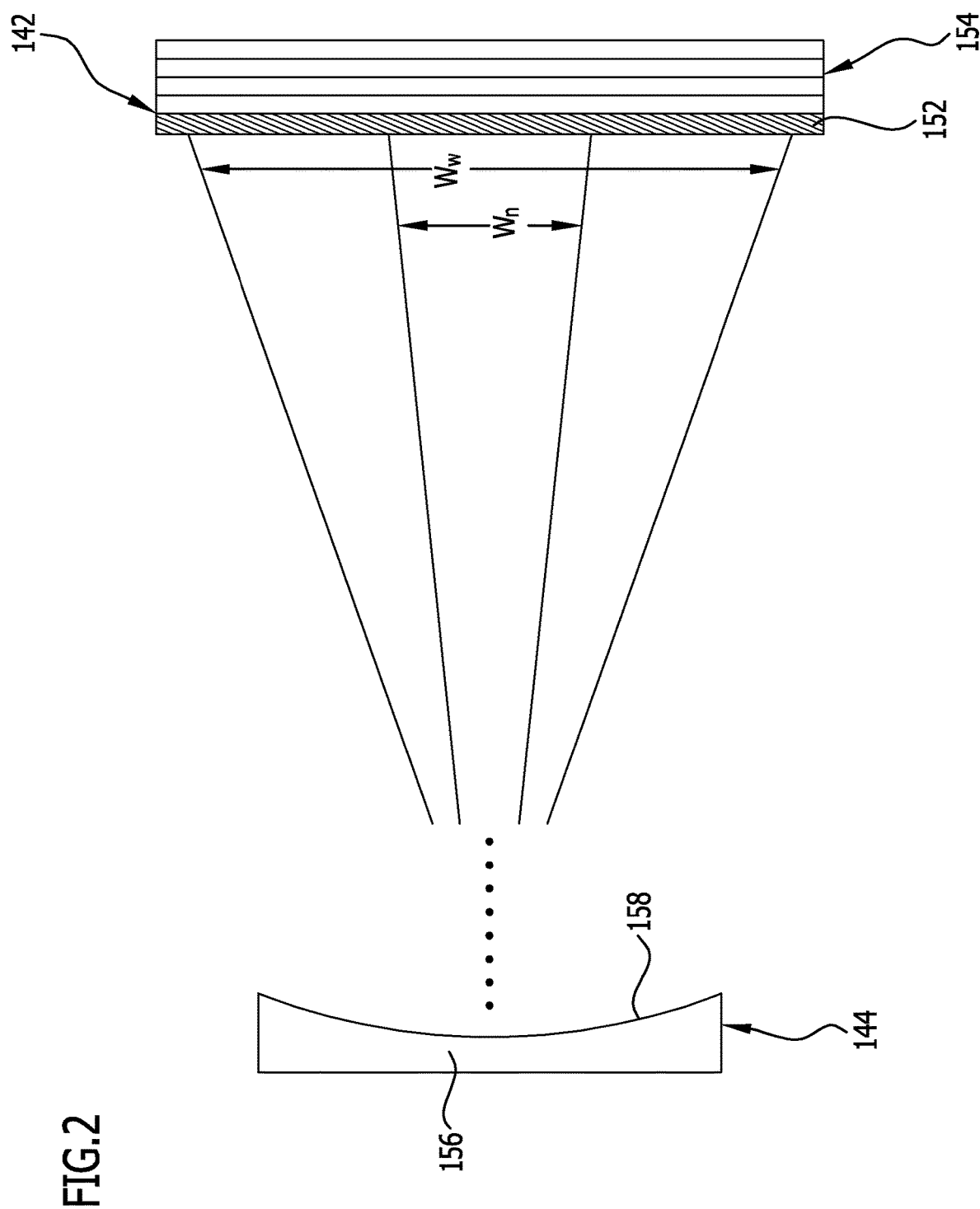
FIG. 2 shows schematically two beam diameters of a radiation field in different operation conditions incident on a selectively response element of the unit.

The selective response device 142 has in particular a saturable absorber, preferably a saturable absorber mirror, which is exemplarily shown in FIG. 2.

Preferably, the saturable absorber mirror is one end mirror of the laser cavity.

Absorption losses within the saturable absorber, in particular in a saturable absorber medium 152 thereof, depend on the fluence of the radiation field, for example on a saturation parameter S which is the fluence of the radiation field divided by a saturation fluence.

Therefore, the selective response device 142 responds in this case selectively on the fluence of the radiation field.

The fluence is the energy of the radiation field per unit cross-section area.

In particular, the fluence is determined by the peak or average energy, the cross sectional size and shape, and the round trip time of the radiation field along optical path 114.

The saturable absorber mirror comprises a reflector 154, which is for example a dielectric mirror comprising several layers, with the saturable absorber medium 152 being attached onto the reflector 154.

In particular, the losses during different operation conditions within the saturable absorber are less than 1% and vary depending on the fluence in the different operation conditions, for example at least approximately in the range between 0.05% and 0.7%.

Figure 3:
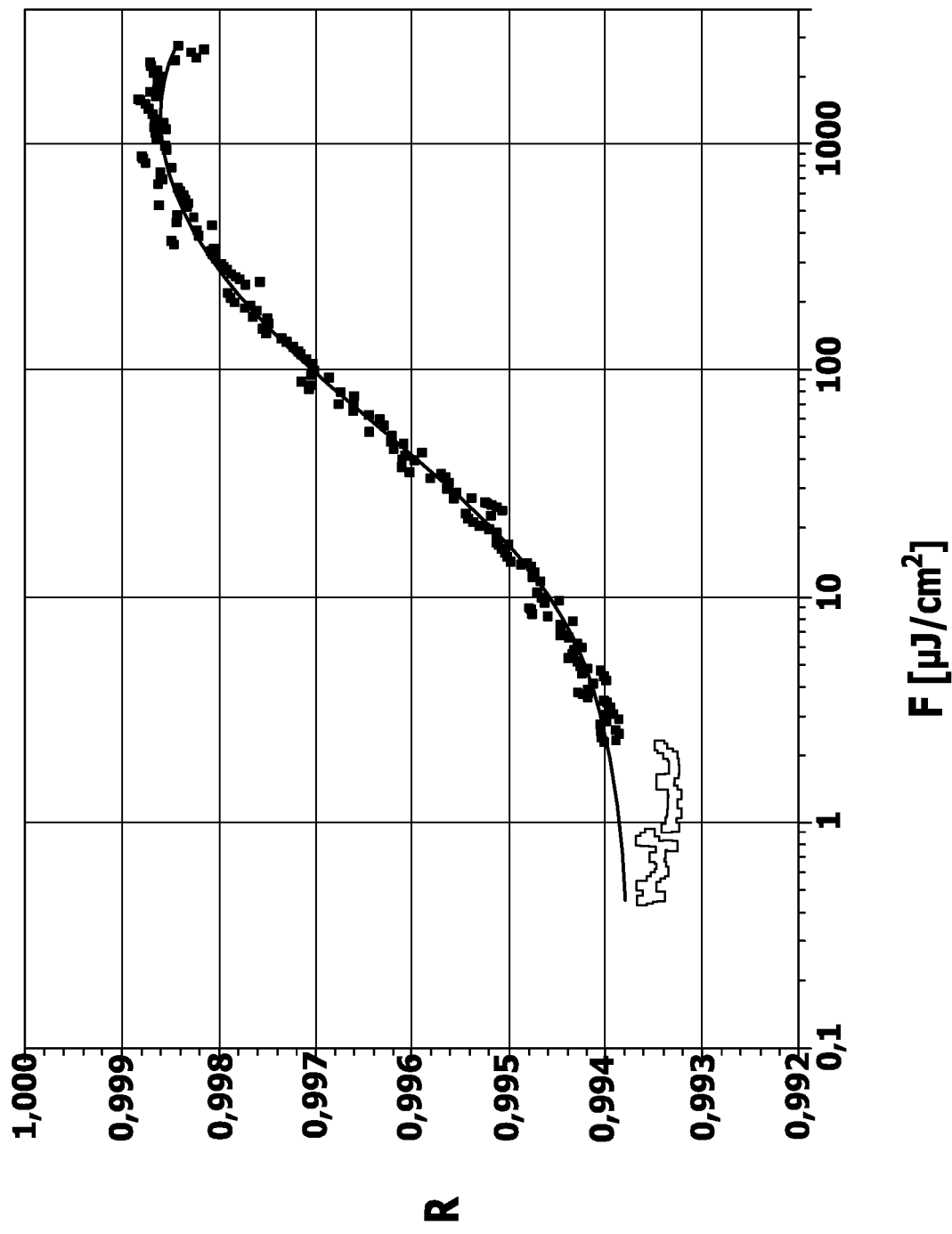
FIG. 3 shows exemplarily a dependence of a reflectivity of a semiconductor saturable absorber mirror as function of the fluence of an incident radiation field.

Accordingly, for the saturable absorber mirror, the reflectivity R which is the ratio of the reflected intensity divided by the incident intensity of the radiation field is in particular larger than 99% and varies depending on the incident fluence, for example between 99.3% and 99.95%, as exemplarily shown in FIG. 3.

The setting device 144 comprises in this embodiment as a radiation field shaping element a deformable mirror 156 with a reflection surface 158, the shape of which is deformable in a desired manner.

In particular, the reflection surface 158 is concave and its radius of curvature C1 is adaptable.

In some variants, the reflection surface is convex and its radius of curvature C1 is adaptable.

In some variants, the reflection surface is deformable between a convex and a concave shape.

The setting device 144 and the selective response device 142 are arranged to each other such that a section 162 of the optical path 114 extends, in particular directly, between the setting device 144 and the selective response device 142.

In particular, the radiation field propagates along the section 162 in both directions, that is the radiation field propagates from the setting device 144 to the selective response device 142 and is reflected for example by reflector 154 and propagates back to the setting device 144 from where it further propagates along another section of the optical path 114, in particular to the outcoupling element 124 and back again.

The optical unit 110 further comprises another radiation field shaping element 166 as part of an optical compensation arrangement which is designated as a whole with 170.

The optical compensation arrangement 170 is in particular provided along a part of the optical path 114 between the optical switching arrangement 150 and the laser amplifying component 121.

For example a section 173 of the optical path 114 in which the laser amplifying component 121 is provided extends to the optical compensation arrangement 170 with the radiation field shaping element 166 and from there another section 174 runs to the radiation field shaping element of the setting device 144 and therefore to the optical switching arrangement 150 with its section which runs to the selective response device 142.

These various sections of the optical path 114 build in this embodiment a main arm 172, along which the radiation field propagates within the optical unit 110 during operation.

In this embodiment, there is only this one single main arm 172.

The radiation field shaping element 166 is in this embodiment a deformable mirror with a reflection surface 178, the shape of which can be deformed in a desired manner. For example the reflection surface 178 is concave with a radius of curvature C2 being adaptable.

Preferably, the radiation field shaping elements of the switching and compensation arrangements 150, 170 build an optical adjustment component for adjusting the radiation field at the selective response element and to provide an uniform shape of the radiation field along the residual part of the optical path, in particular at the amplifying component.

In particular, the radiation field generating system further comprises a controller 182, which is connected to the optical switching arrangement 150, in particular to the setting device 144, and to the optical compensation arrangement 170, in particular to the radiation field shaping element 166, and for example to the laser amplifying component 121.

With the controller 182 settings of the optical switching arrangement 150 and of the optical compensation arrangement 170, in this case in particular the radii of curvatures C1 and C2 of the deformable mirrors of these arrangements 150, 170, can be controlled.

For example the controller 182 has a user interface with which a user can input desired settings, desired operation conditions and/or a desired sequence of operations and the controller 182 controls the operation of the unit 110, in particular the optical switching and compensation arrangements 150, 170, and for example the amplifying component, accordingly.

The optical assembly 112 comprises in some variants of the embodiment for example further optical elements 186, for example further curved mirrors for radiation field shaping and/or dispersive mirrors, which are in particular provided between the optical compensation arrangement 170 and the out coupling element 124.

In some variants a further optical element 186 is a pulse generating component, for example a modulator, for generating short pulses.

For example, in some variants the radiation field generating system comprises an amplifying unit 192 down the outgoing optical path 126. The amplifying unit 192 can be in particular one amplifier or a cascade of amplifiers.

Therefore, a radiation field provided by the optical unit 110 propagates along the outgoing path 126 towards the amplifying unit 192.

The radiation field generating system in particular works at least essentially as follows.

With the optical switching arrangement 150, in particular controlled by controller 182, different operation conditions can be set within the optical unit 110 and therefore the optical unit 110 is operable in different operations providing different kinds of radiation fields.

The different operation conditions in particular comprise continuous wave-operation condition and pulsed operation condition, preferably for producing ultra-short pulses, in dependence on the fluence incident on the saturable absorber.

With the setting device 144 which for example comprises the deformable mirror 156 a shape of the radiation field propagating within the optical unit 110 is set and adjusted in particular by adapting the radius of curvature C1.

Accordingly, a dimension of the shape, in particular its beam diameter, of the radiation field propagating from the setting device 144 to the selective response device 142 is adjustable by the setting device 144 and in consequence the fluence of the radiation field incident on the saturable absorber of the selective response device 142 is adjustable, because the average energy of the radiation field is spread over a narrow width Wn or a wider width Ww, as exemplarily shown in FIG. 2 and the incident fluence is triggered to be above or below a saturation threshold of the saturable absorber.

With a variation of the fluence on the saturable absorber the optical unit 110 is switchable between a continuous wave operation condition when the fluence is below the threshold and pulsed operation condition for the case that the fluence is above the threshold.

For the configuration with the large cross-sectional dimension of the radiation field on the saturable absorber, the fluence of the radiation field is not sufficient to saturate the absorption within the saturable absorber.

Then the optical unit 110 is in continuous wave operation condition.

For the configuration with a smaller cross-sectional dimension of the radiation field, the fluence of pulsed portions of the radiation field is sufficient to saturate the saturable absorber and therefore these pulses experience smaller losses and are getting more amplified whereas for remaining portions of the radiation field between the different pulses the absorption of the saturable absorber is not saturated and therefore they experience larger losses and get suppressed.

In particular, in the pulsed operation condition, the fluence is above the saturation threshold and pulses get amplified, because for these pulses the absorption losses are smaller than for remaining portions of the radiation field of less intensity between the pulses, and therefore these remaining portions get suppressed.

For example, upon switching the shape to the more narrower one, the fluence incident on the saturable absorber increases, in particular above the saturation threshold. Under these conditions for example fluctuations in the radiation filed get strongly amplified and the optical unit switches to pulsed operation, in particular providing ultrashort pulses.

In this condition the optical unit 110 operates in a mode-locked operation.

For example, the transition from continuous wave operation to mode-locked operation occurs spontaneously by small power fluctuations in the radiation field, which get amplified because they experience lower losses at the saturated saturable absorber. In particular, the fluctuations also saturate the gain at the laser active medium.

For example, a transition time between the continuous wave operation and the mode-locked operation is in the order of some microseconds, in particular in a range between 1 microsecond to 100 microseconds.

Accordingly, depending on the conditions set by the optical switching arrangement 150, the optical unit 110 provides at the outgoing path 126 a continuous radiation field or a pulsed radiation field with in particular ultrashort pulses.

With the optical compensation arrangement 170 the variation in the shape of the radiation field which occurs along the section 162 due to the optical switching arrangement 150 is compensated, such that in the remainder of the optical path 114 within the optical unit 110 the radiation field has an at least essentially uniform shape over time which is consistent for achieving the resonating conditions within the unit 110 and for having a desired consistent gain in the laser amplifying component 121.

Figure 4:
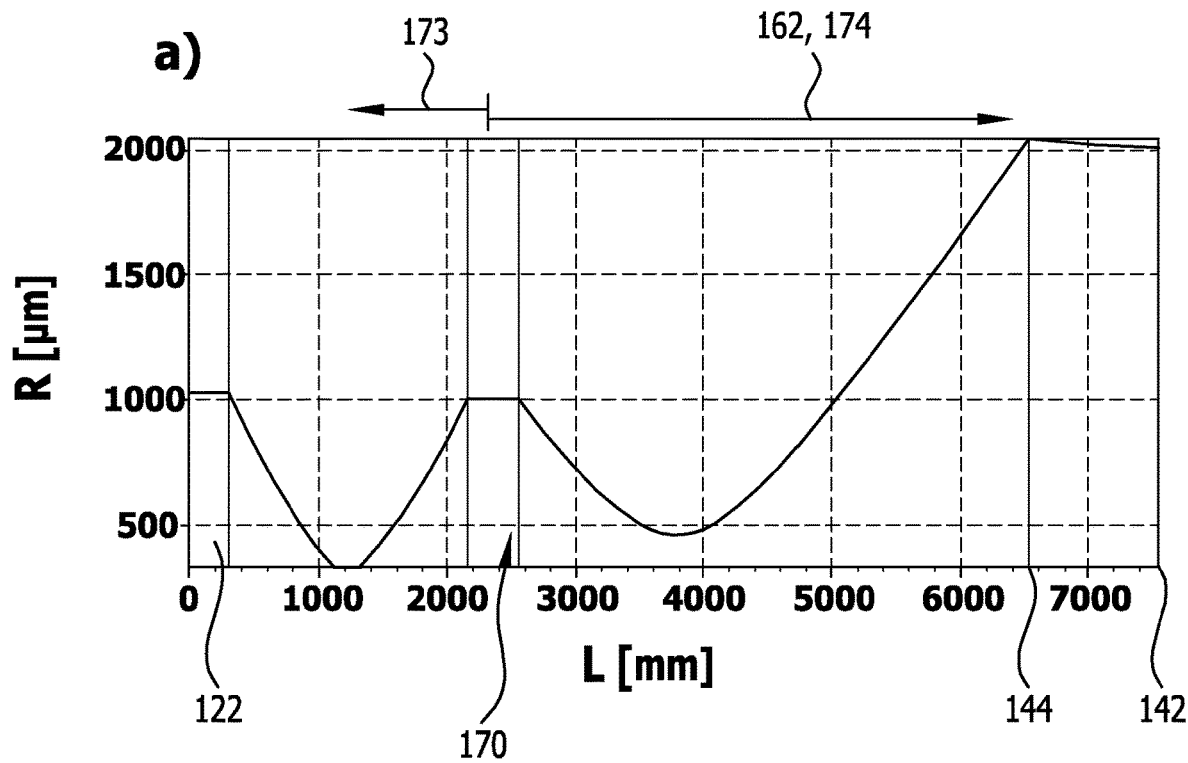
FIG. 4 shows exemplarily beam diameters of a radiation field in two different operation conditions.
Figure 4:
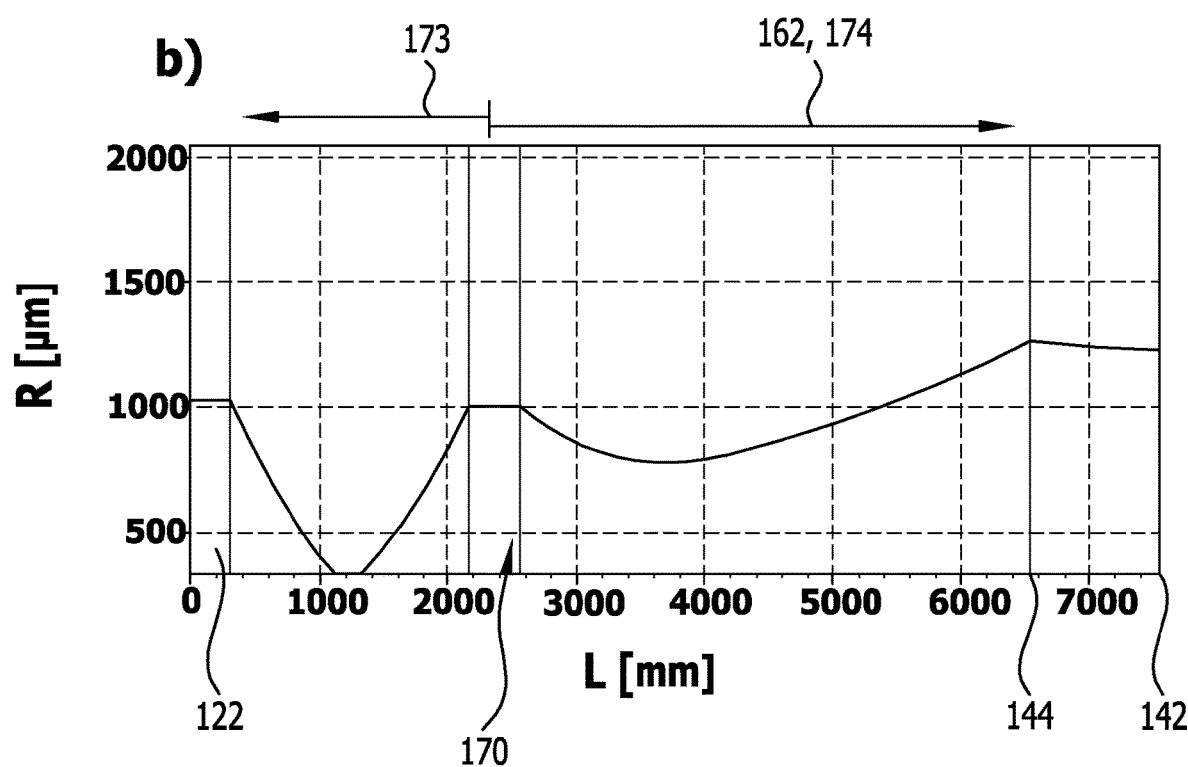

Examples of radiation field beam diameters as a characteristic property of the shape for the continuous wave operation condition and mode-locked operation condition along a part of the optical path 114 are provided in the graphs a) and b) of FIG. 4, respectively.

In these graphs the value of the radius R of the radiation field as its dimension perpendicular to the propagation direction is shown as a function of a distance L along the optical path 114.

The right-hand side of these graphs corresponds to the sections 162 and 174 within the optical switching and compensation arrangements 150, 170 and the location of the selective response device 142, which is for example the saturable absorber, corresponds to the right end of the graphs.

The left-hand side of the graphs of FIG. 4 corresponds to a part of the remaining optical path 114, in particular to the section from the optical compensation arrangement 170 to the laser active medium 122, the location of the latter corresponding to the far left end of the graphs.

For the continuous wave operation condition the optical switching arrangement 150 is set to provide a large radius, for example a radius of about 2.000 µm, at the selective response device 142, as exemplarily shown in the graph a) of FIG. 4, whereas for the mode-locked and therefore pulsed operation condition the optical switching arrangement 150 is set such that the radiation field has a smaller radius, for example a radius of about 1.200 µm, at the selective response device 142, as exemplarily shown in the graph b) of FIG. 4.

The optical compensation arrangement 170 is adjusted such that in each case the radiation shape in the remaining part of the optical path 114 is uniform and in particular consistent to have resonating conditions in the laser cavity. For example, in this case a radius R of the radiation field of about 1.000 µm at the laser active medium 122 is provided in the continuous wave-operation condition as well as in the mode-locked operation condition.

For example the continuous wave operation condition can be achieved with the two deformable mirrors of the optical switching and compensation arrangements 150, 170 having a radius of curvature C1 of about 5.7 m and a radius of curvature C2 of about 3 m.

For example the mode-locked and therefore pulsed operation condition can be achieved with the two deformable mirrors of the optical switching and compensation arrangements 150, 170 having a radius of curvature C1 of about 8.17 m and a radius of curvature C2 of about 7.65 m.

Furthermore, if desired, with the controller 182 the pumping device 123 can be controlled, for example to adjust the amount of provided pumping energy for setting the average power of the provided radiation field and/or for compensating for different losses in the different operating conditions.

The optical unit 110 provides along the outgoing path 126 a radiation field which can be further used, for example provided to the amplifying unit 192 for further amplification and/or to a frequency conversion unit and/or for use of the radiation field in an application, in particular for material processing.

Figure 5:
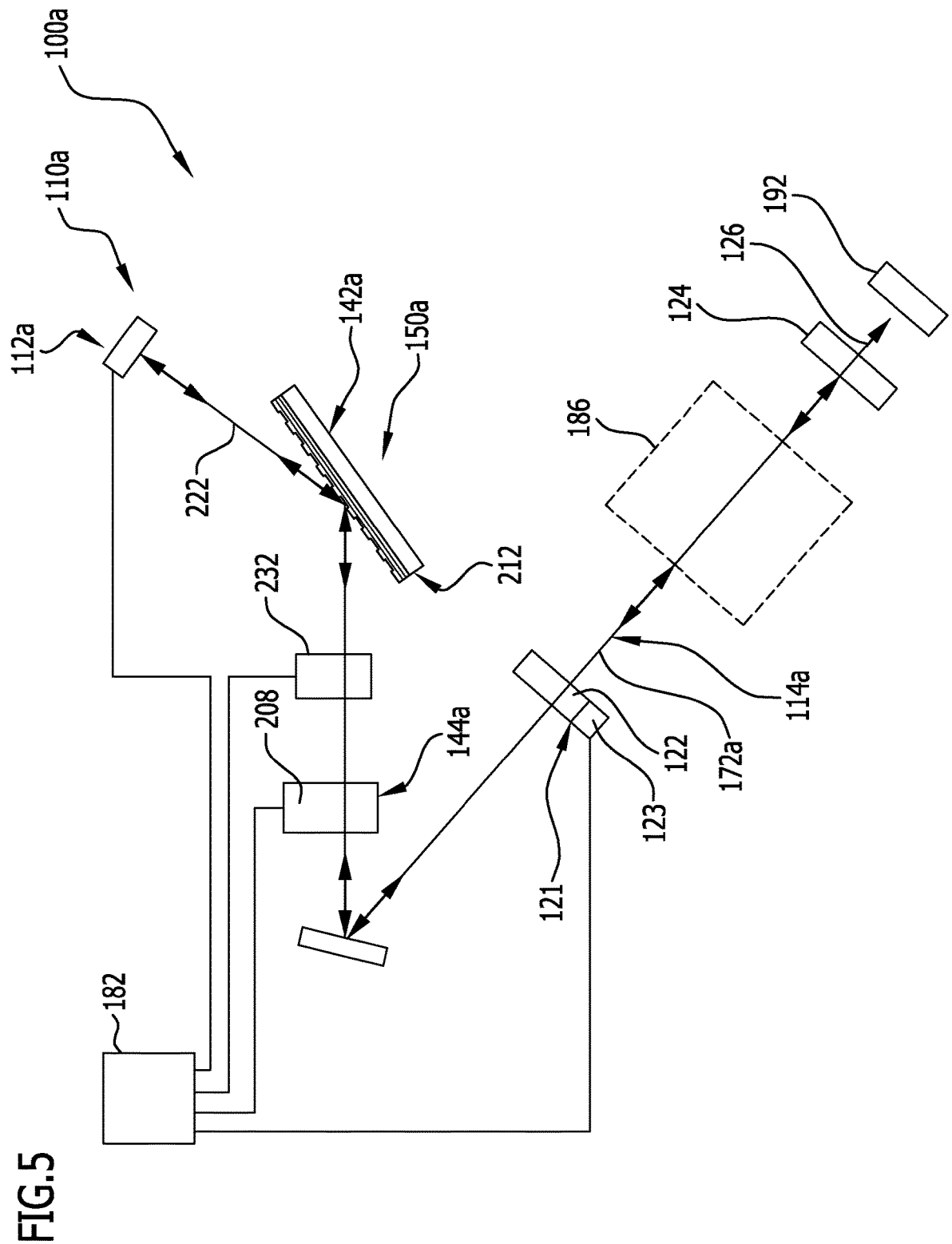
FIG. 5 shows another embodiment of a radiation field generating system with an optical unit operable in several operation conditions.
Figure 6:
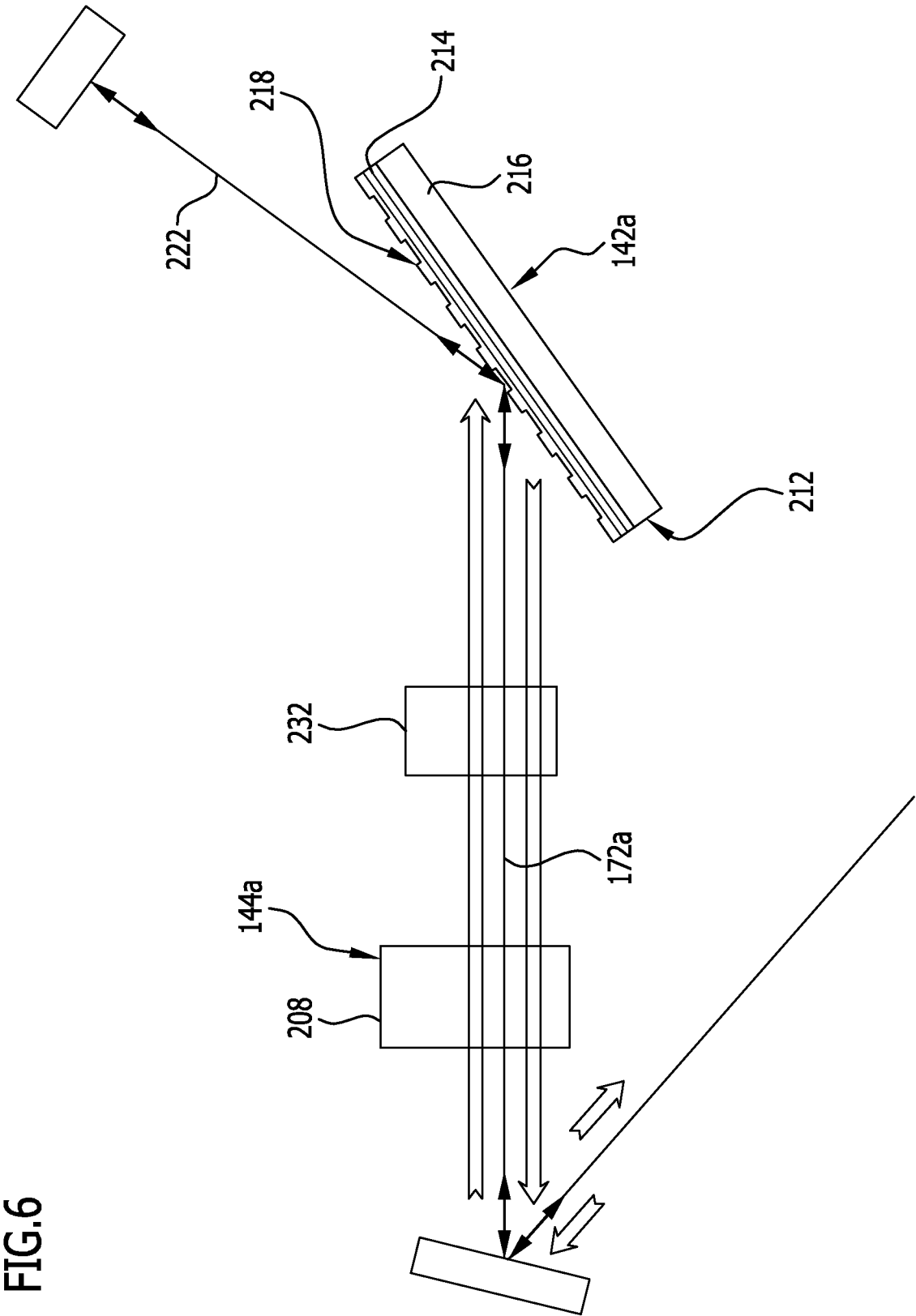
FIG. 6 shows an enlarged extract of the unit of FIG. 5 and with the propagation of a radiation field for one operation condition indicated therein.
Figure 7:
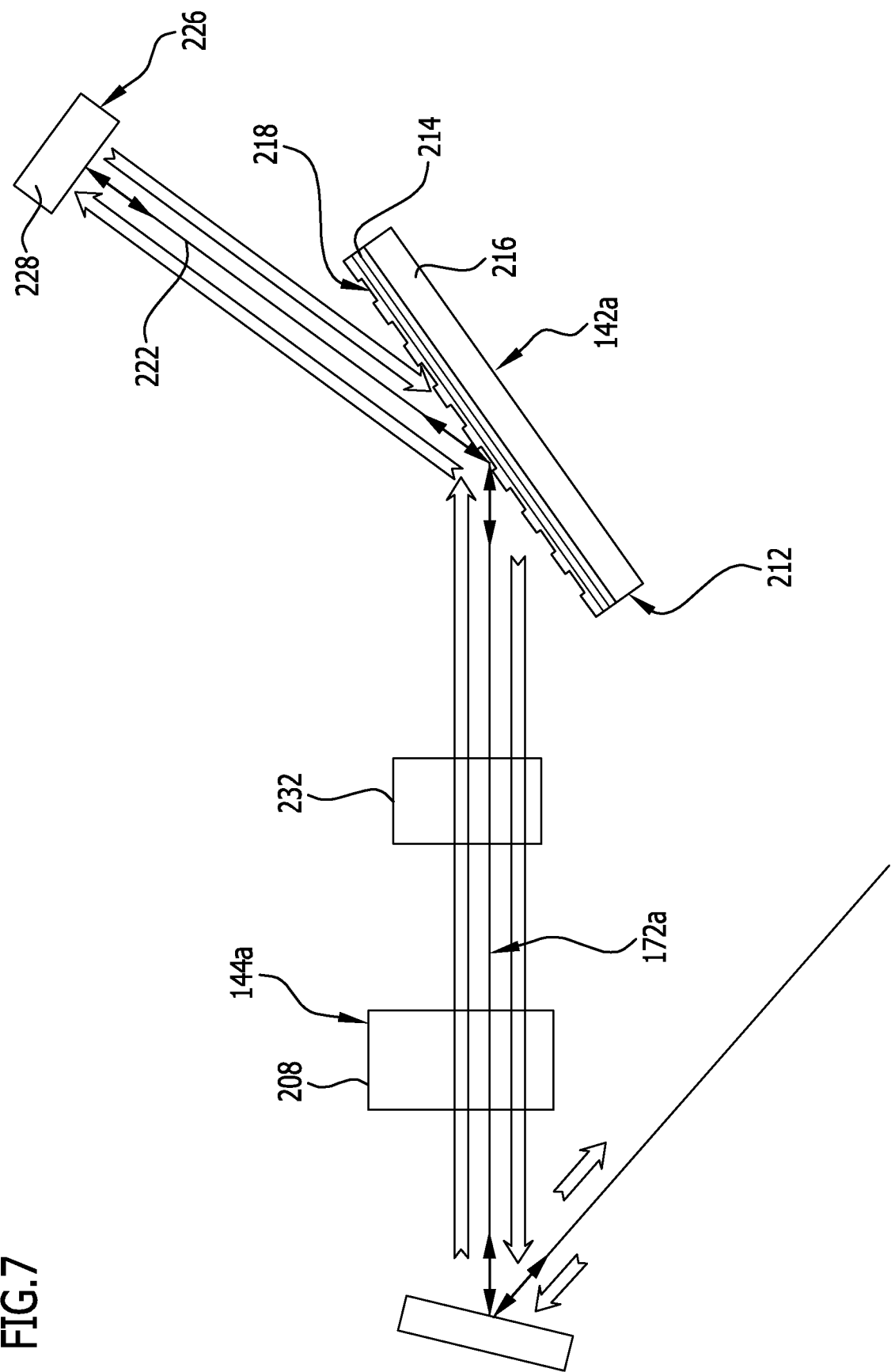
FIG. 7 shows the same enlarged extract than FIG. 6 but with the propagation of the radiation field indicated for another operation condition.

Another embodiment of a radiation field generating system 100a is exemplarily shown in FIGS. 5 to 7.

Elements of this embodiment which fulfill at least essentially a same function and/or are at least essentially build the same as an element of the previous embodiment are designated with the same reference sign and it is referred to above-given explanations of these elements as far as in the following nothing different is provided. In particular, if a specific realization of one of these elements in this embodiment is to be particularly emphasized, a suffix "a" is added to the reference sign to designate this embodiment.

The radiation field generating system 100a comprises an optical unit 110a with an optical assembly 112a which defines an optical path 114a within the optical unit 110a.

In particular, the optical unit 110a with its optical assembly 112a is built as a resonator.

The optical unit 110a comprises an amplifying component 121 with a laser active medium 122 and an associated pumping device 123. The laser active medium 122 is provided in a main arm 172a of the optical path 114.

The optical assembly 112a comprises an outcoupling element 124 at which the optical path 114 is connected to an outgoing path 126.

For example, the outcoupling element 124 is at one end of the main arm 172a.

Furthermore, the optical unit 110a comprises an optical switching arrangement 150a with a selective response device 142a and a setting device 144a.

The optical switching arrangement 150a of this embodiment is capable to switch between different operation conditions based on the polarization of the radiation field within the optical assembly 112a.

Therefore, in the main arm 172a the setting device 144a is provided which comprises in this embodiment a polarization switching element 208 for setting the polarization of the radiation field for example pockels cell or a ware plate, in particular a half-wave plate.

In this embodiment, the selective response device 142a comprises a deflection element 212, which directs incident radiation field in different directions depending on the polarization of the incident radiation field.

The deflection element 212 is provided at one end of the main arm 172a and the optical path 114a bifurcates at the deflection element 212 into a supplementary arm 222.

For example, the deflection element 112 is a grating mirror.

The grating mirror comprises a reflector 214 which is on one side arranged on a substrate 216 and on the other side of the reflector a grating structure 218 is provided, as exemplarily shown in FIGS. 6 and 7. The grating structure forms a diffraction grating which provides for the selective redirection of the radiation field based on the polarization.

For example, the reflector 214 and the grating structure 218 are built by a stack of dielectric layers and preferably the grating structure 218 is provided in the top layer or in several top layers of the stack. The top layer or the top layers are on the opposite side of the stack than a bottom layer of the same which is provided on the substrate 216.

Advantageously, at least the layers of the reflector 214 have alternatingly a high and a low refractive index.

In particular, the redirection is achieved by using the deflection element 112, in particular the diffraction grating, in Littrow configuration In the Littrow configuration for a particular polarization the radiation field which is incident on the deflection element 212 is reflected back into the same arm, here the main arm 172a, from which it is incident, but with reverted direction of propagation, as exemplarily shown in FIG. 6, whereas for a different polarization the radiation field which is incident from main arm 172a, is reflected into supplementary arm 222 as exemplarily shown in FIG. 7.

For example, an incident radiation field with transverse electric (TE) polarization is reflected by the deflection element 212 in the Littrow configuration, in particular in the minus first diffraction order, directly back on the same arm 172a but with reverted propagation direction.

For example an incident radiation field with transverse magnetic (TM) polarization is reflected by the deflection element 112 in the Littrow configuration, in particular in the zeroth diffraction order, into supplementary arm 222.

In the supplementary arm 222 a pulse generating device 226 is provided, such that within the supplementary arm pulsed operation conditions are realized.

In particular, the pulse generating device 226 comprises a saturable absorber 228 for realizing the pulse generating condition for generating ultrashort pulses.

For example, the saturable absorber 228 is a semiconductor saturable absorber and/or a saturable absorber mirror.

In some variants of the embodiment, in the main arm 172a another pulse generating device 232 is provided. In particular, this pulse generating device 232 is capable for providing short pulses with pulse durations for example within the nanosecond range or larger.

For example, the pulse generating device 232 comprises an accusto-optic modulator or an electro-optic modulator and in particular employs Q-switching for the pulse generation.

In other variants of the embodiment, there is no pulse generating device within the main arm 172a.

For example, the optical unit 110a comprises one or several further optical elements 186 in particular in the main arm 172a, for example for shaping the radiation field and/or for stabilizing the radiation field.

Preferably, the optical unit 110a comprises a controller 182 which is connected to the setting device 144a and for example to the pumping assembly 123 and/or pulse generating device 226 in supplementary arm 222 and/or pulse generating device 232 in main arm 172a.

With the controller 182 a user of the radiation field generating system 100a is capable to control the conditions within the optical unit 110a and to control the operation thereof.

For example, the radiation field generating system 100a comprises within the outgoing optical path 126 an amplifying unit 192, which for example is a single amplifier or a cascade of amplifiers, as explained in connection with the first embodiment.

In particular, the radiation field generating system 100a works at least essentially as follows.

A radiation field is propagating along the optical path 114a within the optical unit 110a and, in particular under control of a user, the polarization is set by the polarization switching element 208.

Depending on the polarization of the propagating radiation field, the radiation field propagates solely along the main arm 172a or along the main arm 172a and the supplementary arm 222.

For one polarization, as exemplarily shown in FIG. 6, the radiation field propagating along main arm 172a and being incident on the deflection element 212 is reflected back into main arm 172a and therefor propagates solely along the main arm 172a, in particular between the deflection element 212 and the outcoupling element 124, along which the conditions are set for continuous wave operation and in variants with pulse generating device 232 in the main arm 172a in addition for pulsed operation conditions in particular for generating short pulses. Therefore, the optical unit 110a provides in this conditions a continuous wave radiation field on the outgoing path 126 or pulses as generated by the pulse generating device 232.

If the polarization of the radiation field is switched by the polarization switching element 208 to another polarization for which the deflection element 112 directs the along the main arm 172a incident radiation field into supplementary arm 222, as exemplarily shown in FIG. 7, the radiation field propagates along the part of the optical path provided from the outcoupling element 124 to the deflection element 212 into the supplementary arm 222 with the pulse generating device 226 which is in particular configured for generating ultra-short pulses. In this case, pulsed operation conditions are realized within the optical unit 110a, in particular for generating ultra-short pulses, and pulses of the radiation field are provided by the optical unit 110a along the outgoing path 126.

Similarly to the first embodiment, the provided radiation field on outgoing path 126 is in some variants further amplified by amplifying unit 192 and/or provided for application, in particular for material processing.

Figure 8:
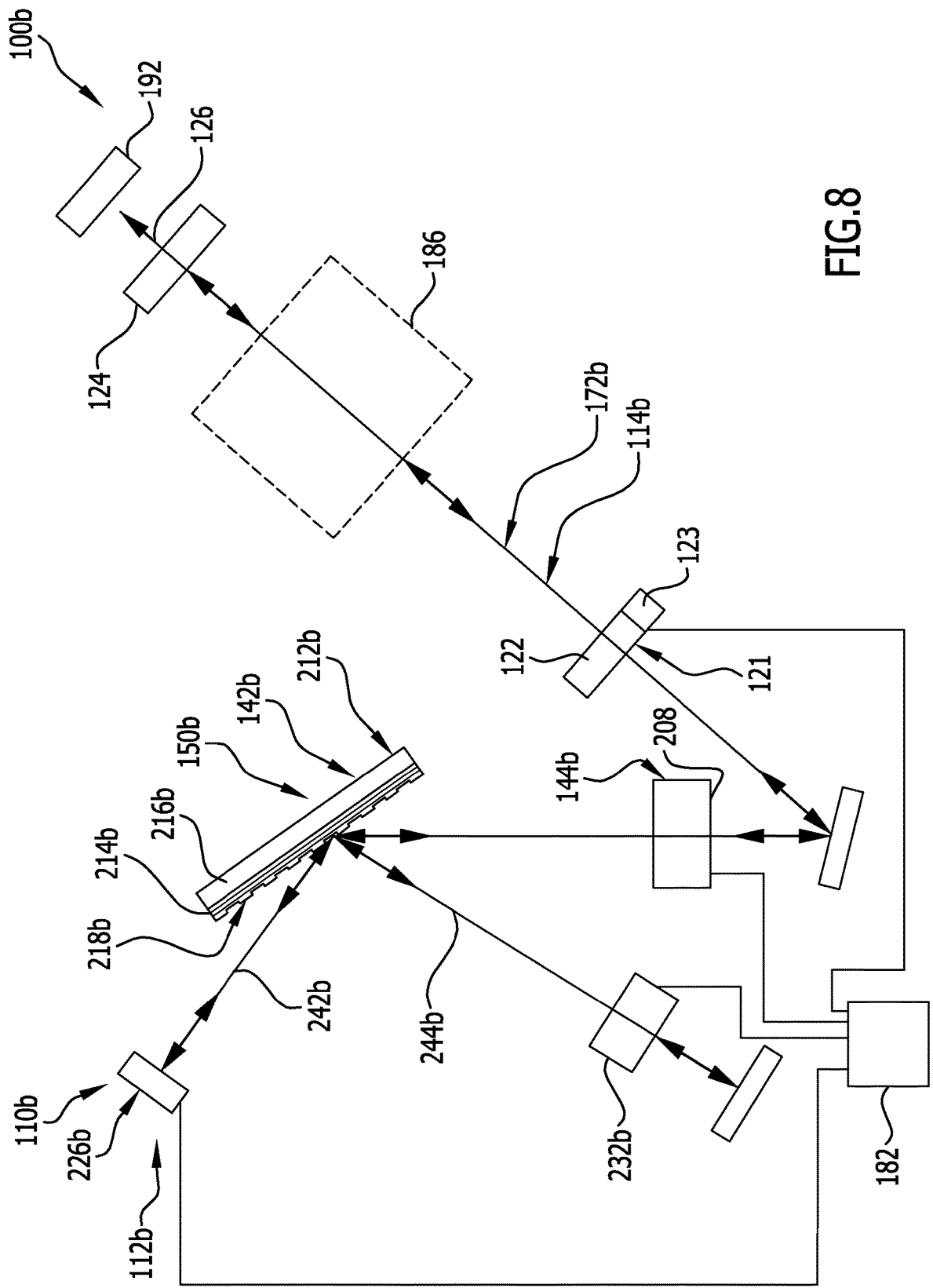
FIG. 8 shows another embodiment of a radiation field generating system with an optical unit operable in several operation conditions.
Figure 9:
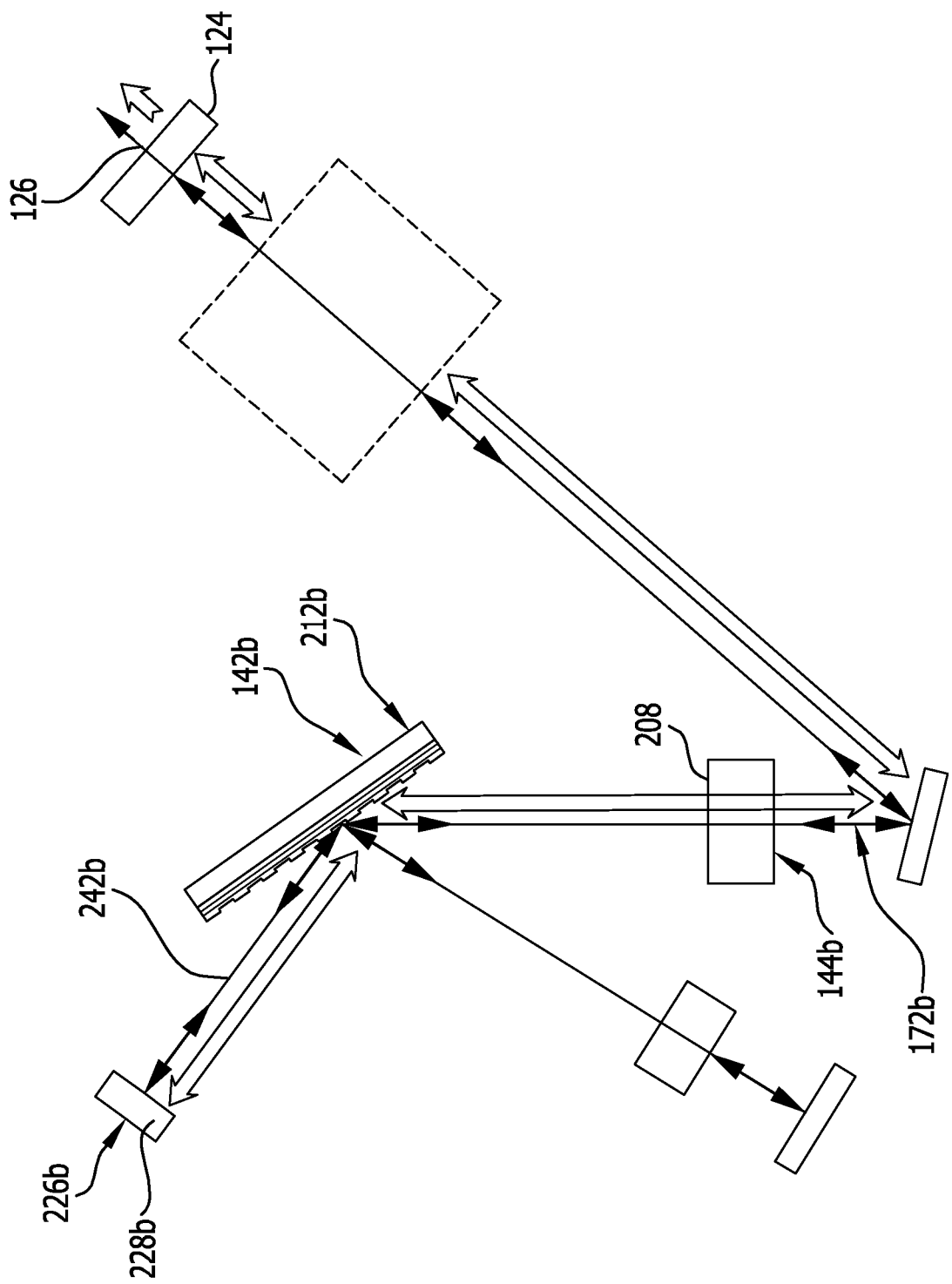
FIG. 9 shows a propagation of radiation field in the unit of FIG. 8 for one operation condition.
Figure 10:
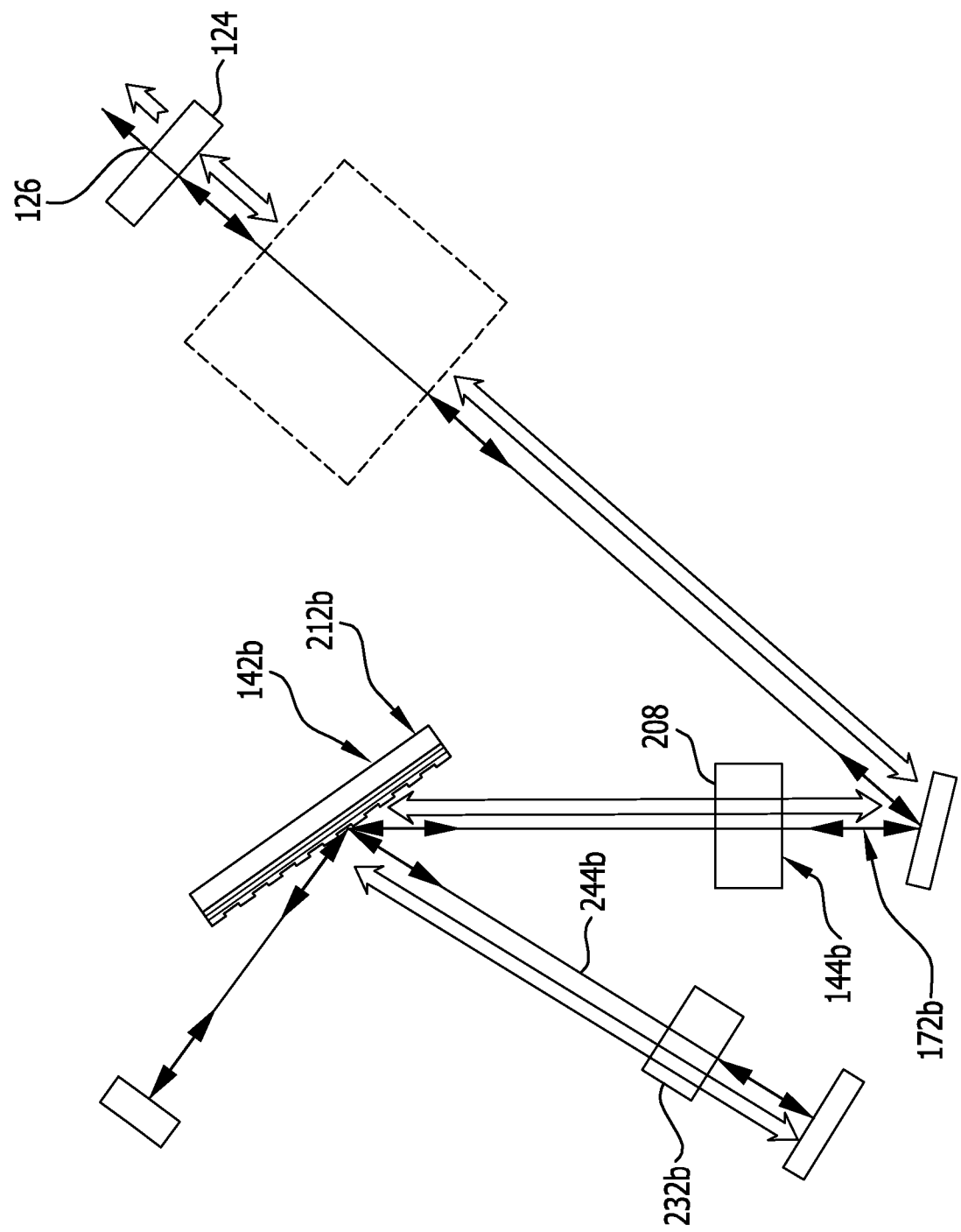
FIG. 10 shows a propagation of radiation field in the unit of FIG. 8 for another operation condition.

Another embodiment of a radiation field generating system 100b is exemplarily shown in FIGS. 8 to 10.

Elements of this embodiment which at least essentially perform the same function or are built at least essentially the same as an element of one of the previous embodiments are designated with the same reference sign and it is referred to the explanations given in connection with the previous embodiments about these elements as far as nothing else is provided hereafter. In particular, if a realization within this embodiment is to be particularly emphasized, a suffix "b" designating this embodiment is added to the reference sign.

The radiation field generating system 100b comprises an optical unit 110b with an optical assembly 112b defining an optical path 114b.

In particular, the optical unit 110b is designed as a resonator.

In particular, the optical unit 110b comprises an amplifying component 121 with a laser active medium 122 and for example an associated pumping device 123. Preferably, the laser active medium 122 is arranged in a main arm 172b of the optical path 114b.

The optical unit 110b comprises an outcoupling element 124 at which the optical path 114 is connected to an outgoing path 126 for providing a radiation field out of the optical unit 110b.

The optical unit 110b comprises an optical switching arrangement 150b with a selective response device 142b and a setting device 144b.

In this embodiment the optical switching arrangement 150b is capable for switching between different operation conditions based on the polarization of the radiation field.

Therefore, the setting device 144b comprises a polarization switching element 208.

For example, similarly to the above explained embodiment of radiation field generating system 100a, the polarization switching element 208 is for example a pockels-cell or a wave plate, in particular a half-wave plate.

The setting device 144b is provided in the main arm 172b of the optical path 114b and in particular with respect to a direction of propagation of the radiation field provided between the outcoupling element 124 and the selective response device 142b.

The selective response device 142b responses selectively on the polarization of the radiation field in that depending on the polarization the device redirects an along main arm 172b incident radiation field differently.

Therefore, the selective response device 142b comprises a deflection element 212b.

In particular, the deflection element 212b comprises a reflector 214b which on one side is arranged on a substrate 216b and on a side opposite to the substrate 216b the reflector 214b is provided with a grating and/or diffraction structure 218b for selectingly reflecting the incident radiation field based on the polarization of the same.

In difference to the above explained embodiment of radiation field generating system 100a, in this embodiment the deflection element 212 is not used in Littrow configuration.

In this embodiment the deflection element 212b is configured and designed such that a radiation field coming from the main arm 172b and being incident on the deflection element 212b is reflected in two different supplementary arms 242b and 244b depending on the polarization, as exemplarily shown in FIGS. 9 and 10.

For example, an along main arm 172b incident radiation field with transverse magnetic (TM) polarization is reflected in zeroth diffraction order into supplementary arm 242b and an along main arm 172b incident radiation field with transverse electric (TE) polarization is reflected in minus first diffraction order into supplementary arm 244b.

Further, the deflection element 212b, in particular its grating structure, is designed, such that a propagating radiation field along supplementary arm 242b or supplementary arm 244b and which is incident on deflection element 212b is in each case reflected back into main arm 172b.

In FIG. 9 exemplarily the propagation of the radiation field with one of these polarizations is shown along the main arm 172b and supplementary arm 242b and in FIG. 10 the propagation for a radiation field with a different polarization along main arm 172b and supplementary arm 244b is exemplarily shown.

In one of the supplementary arms, for example in supplementary arm 242b, a pulse generating device 226b is provided and therefore the optical unit 110b is along this supplementary arm 242b together with the main arm 172b configured for pulsed operation conditions, in particular for generating ultra-short pulses.

In particular, pulse generating device 226b is capable for generating ultra-short pulses and in particular comprises a saturable absorber 228b, for example a semiconductor saturable absorber.

In particular, in this supplementary arm 242b an endmirror is provided between which and the deflection element 212b the supplementary arm is defined.

For example, the saturable absorber 228b is designed as saturable absorber mirror and provides for the end mirror.

The other supplementary arm, for example supplementary arm 244b, is together with the main arm 172b configured for a continuous wave operation.

In particular, in this supplementary arm 244b an endmirror is provided between which and the deflection element 212b this supplementary arm 244b is defined.

For example, in some variants of the embodiment another pulse generating device 232b is provided in the supplementary arm for continuous wave operation conditions, for example in supplementary arm 244b, with this additional pulse generating device 232b being capable in particular for providing short pulses.

For example, this pulse generating device 232b comprises an accusto-optic modulator or an electro-optic modulator and is in particular designed for Q-switching. In this case, the supplementary arm, for example supplementary arm 244b, is therefore capable for both, continuous wave operation and pulsed operation condition for short pulses.

In other variants of the embodiment, there is no pulse generating device in the supplementary arm 244b and therefore the part of the optical path 114b of supplementary arm 244b and main arm 172b is configured solely for continuous wave operation in these variants.

In particular, optical unit 110b comprises a controller 182 which is connected to setting device 144b and for example to pumping device 123 and/or pulse generating device 232b and/or pulse generating device 226b. With controller 182 a use of the radiation field generating system 100b can input desired operation conditions and sequences of operation conditions and controller 182b controls accordingly optical unit 110 and its elements. For sake of clarity, controller 187 is only shown in FIG. 8.

For example, optical unit 110b and in particular optical assembly 112b comprise in some variants of the embodiment further optical elements 186, for example for radiation shape shaping and/or stabilization of the shape and/or polarization.

For example, radiation field generating system 100b comprises further an amplifying unit 192, which can be a single amplifier or a cascade of amplifier. The outgoing radiation field provided by optical unit 110b propagates along outgoing optical path 126 to amplifying unit 192 and is amplified by amplifying unit 192.

In particular, the radiation field generating system 100b works similarly to the radiation field generating system 100a, with the difference that for radiation field generating system 100b of this embodiment the different operation conditions are realized along different supplementary arms 242b, 244b together with the main arm 172b.

For example, the optical unit 110b is along supplementary arm 242b together with main arm 172b configured for pulsed operation conditions, in particular for generating ultra-short pulses, and along supplementary arm 244b together with main arm 172b configured for continuous wave operation and in some variants of the embodiment in addition for pulsed operation conditions in particular for generating short pulses.

In this embodiment, with the setting device 144b the polarization of the radiation field is set and depending on the set polarization the radiation field is directed by selective response device 142b from main arm 172b to either of supplementary arms 242b and 244b and back to main arm 172b as exemplarily shown in FIGS. 9 and 10 and therefore depending on the polarization set by the setting device 144b different operation conditions are realized in the optical unit 110b.

Accordingly, optical unit 110b provides, in particular on demand and as controlled by controller 182 in accordance with an input by a user, along outgoing path 126 a continuous wave radiation field and/or a pulsed radiation field.

The radiation field provided by optical unit 110b is for example further amplified by amplifying unit 192 and/or in particular provided to applications, in particular for material processing.

Yet another embodiment of a radiation field generating system 110c is exemplarily shown in FIGS. 11 to 14.

Elements of this embodiment which at least essentially perform the same function and/or are at least essentially build the same as an element of one of the previous embodiments are designated with the same reference sign and it is referred to the explanations given thereto in connection with the previous embodiments as long as nothing else is provided below.

In particular, several parts of this embodiment of radiation field generating system 100c are similar to the previous embodiment 100b and it is referred to the explanations given to this embodiment as far as nothing different is provided below.

In this embodiment the radiation field generating system 100c comprises an optical unit 110c with an optical assembly 112c defining an optical path 114c.

In particular, optical unit 110c is designed as a resonator.

Similarly to the previous embodiment 100b, the optical unit 110c comprises a laser amplifying component 123 with a laser active medium 122 provided in a main arm 172c and in particular an associated pumping device 123.

In particular, optical assembly 112c comprises an outcoupling element 124 at which optical path 114c is connected to an outgoing path 126 along which an outgoing radiation field is provided by optical unit 110c.

The optical unit 110c has an optical switching arrangement 150c, which is in particular similar to optical switching arrangement 150b, and comprises a setting device 144 and a selective response device 142 with which depending on a characteristic property of the radiation field a radiation field propagating along the main arm 172c can be redirected to different supplementary arms.

In particular, setting device 144 comprises a polarization switching element 208 and selective response device 142 comprises a deflection element 212 as described above in connection with embodiment 100b such that reference is made to the explanations given there.

Figure 11:
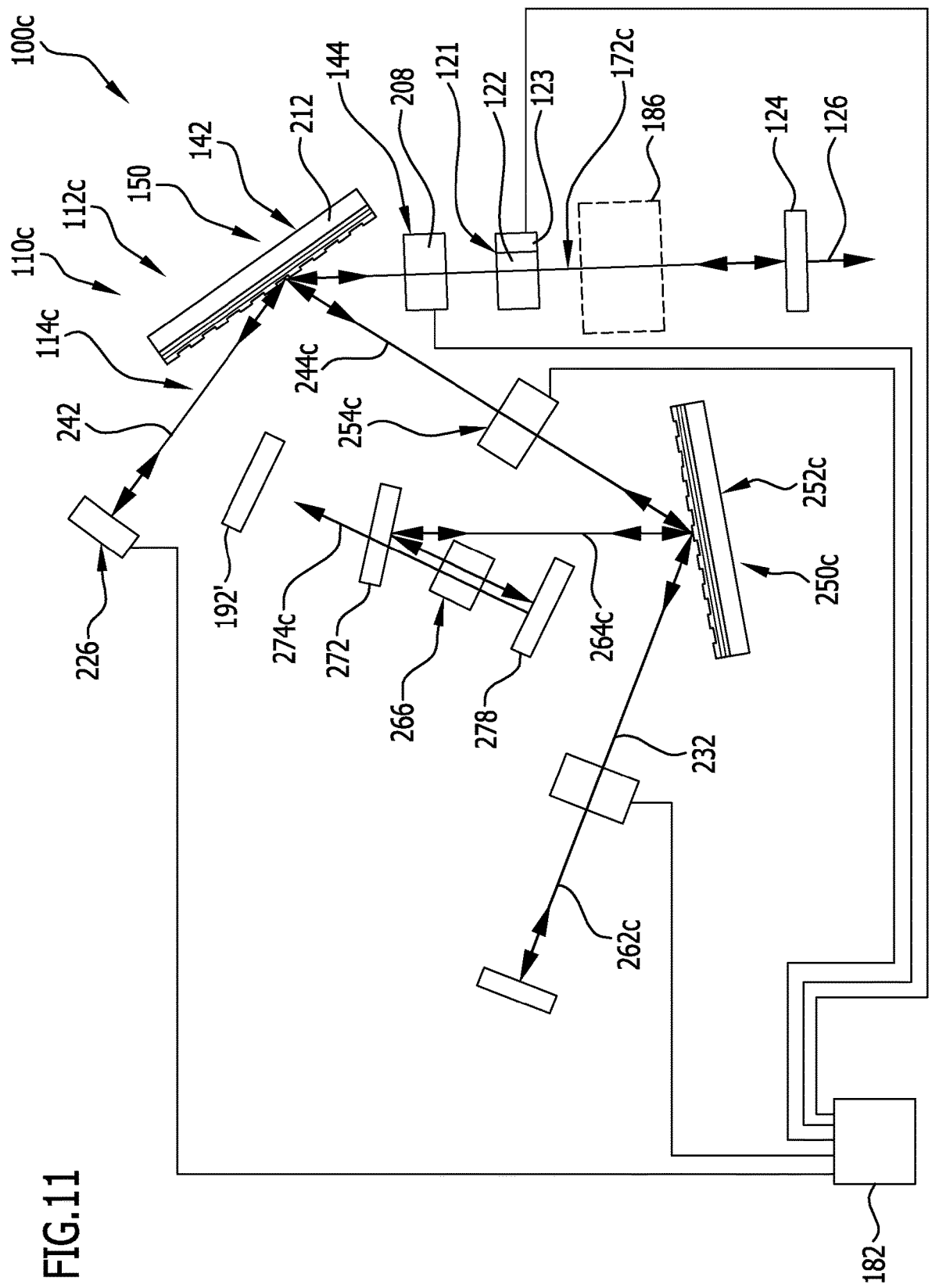
FIG. 11 shows another embodiment of a radiation field generating system with an optical unit operable in several operation conditions.
Figure 12:
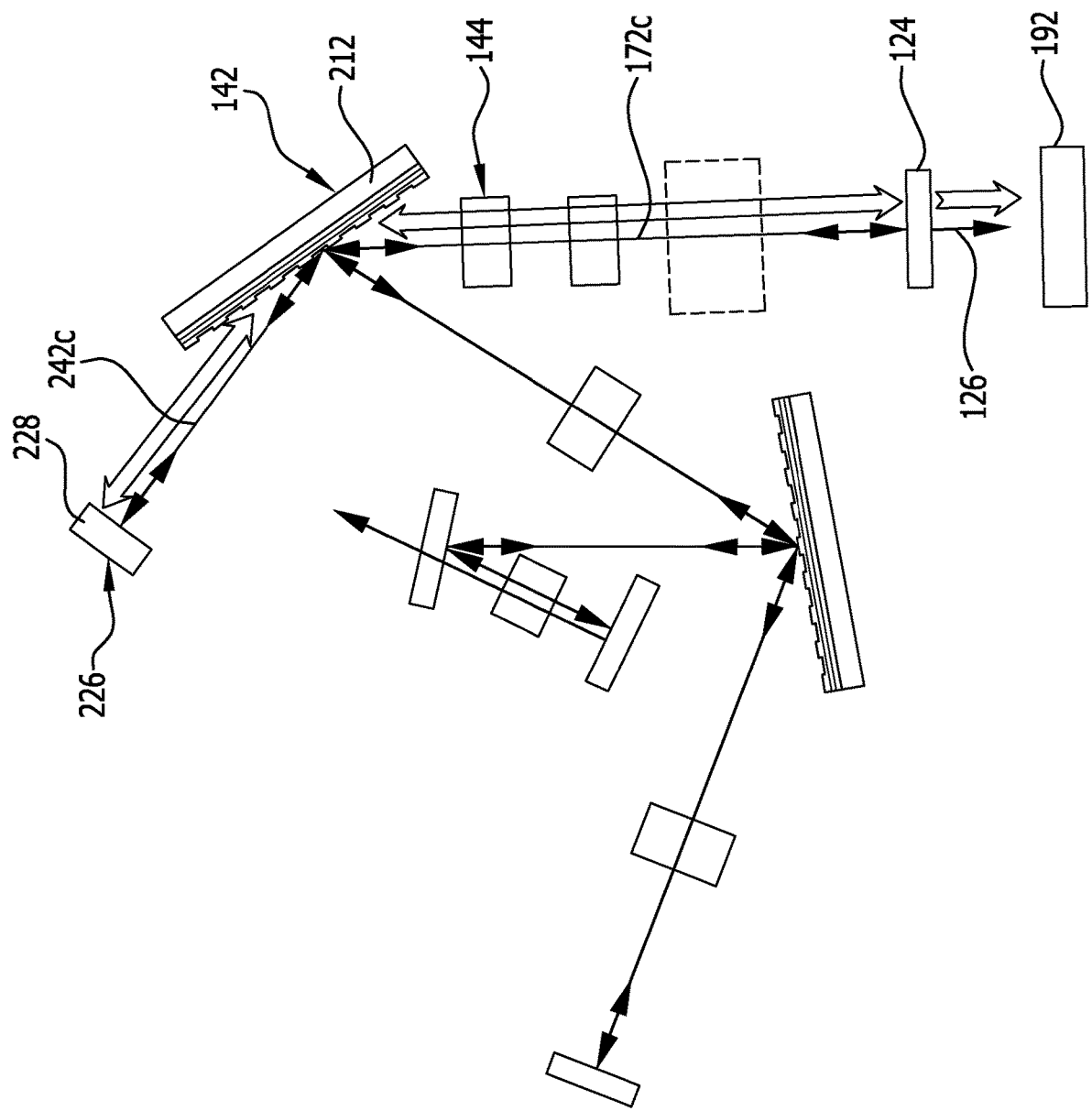
FIG. 12 shows a propagation of a radiation field in the unit of FIG. 11 for one operation condition.

One of the supplementary arms, exemplarily shown in FIGS. 11 and 12, for example supplementary arm 242c is similarly designed as supplementary arm 242b of the previous embodiment with a pulse generating device 226, which is in particular configured for producing ultra-short pulses, and for example comprises a saturable absorber 228 and for details it is fully referred to the explanations given above.

Figure 13:
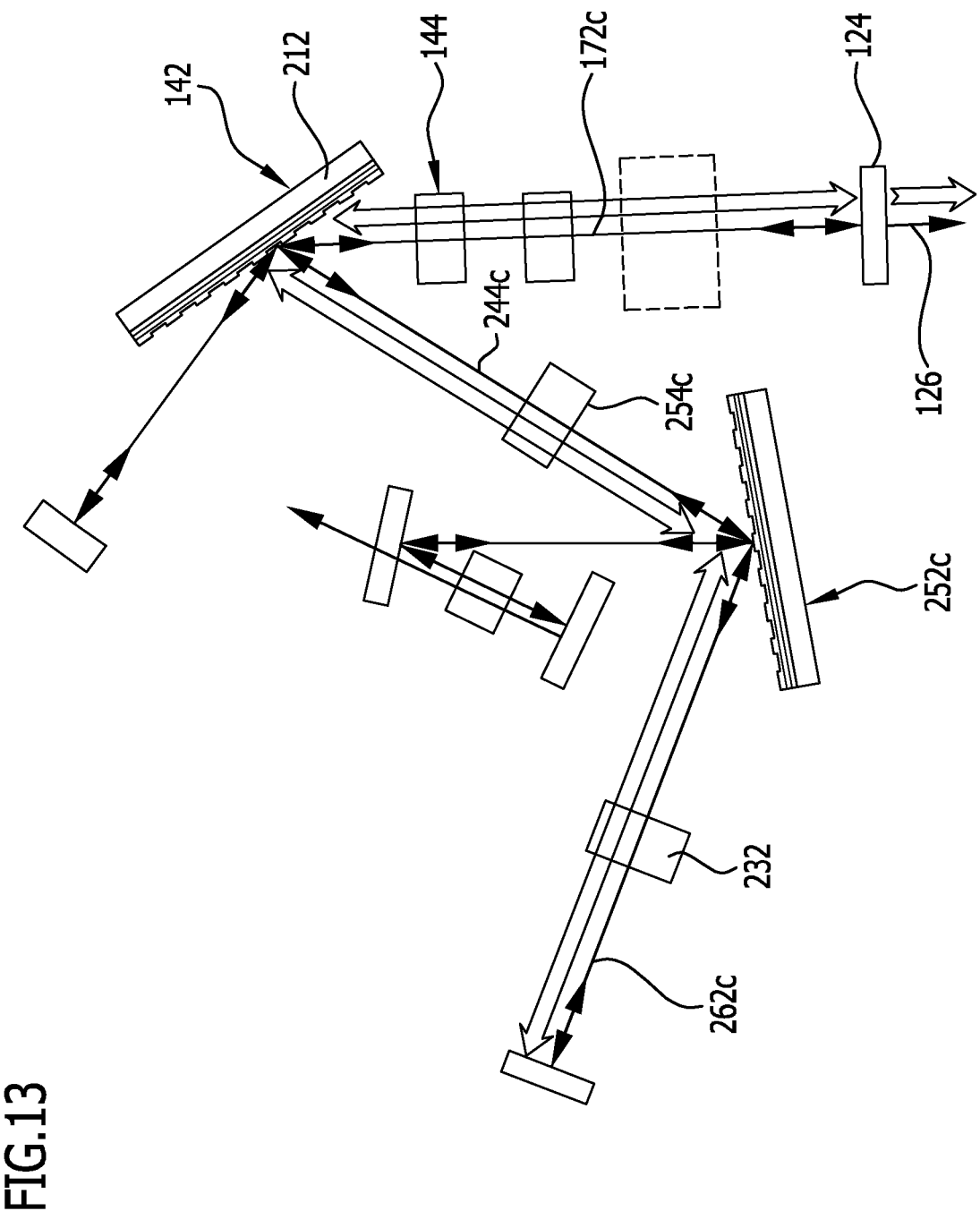
FIG. 13 shows a propagation of a radiation field in optical unit of FIG. 11 for another operation condition.
Figure 14:
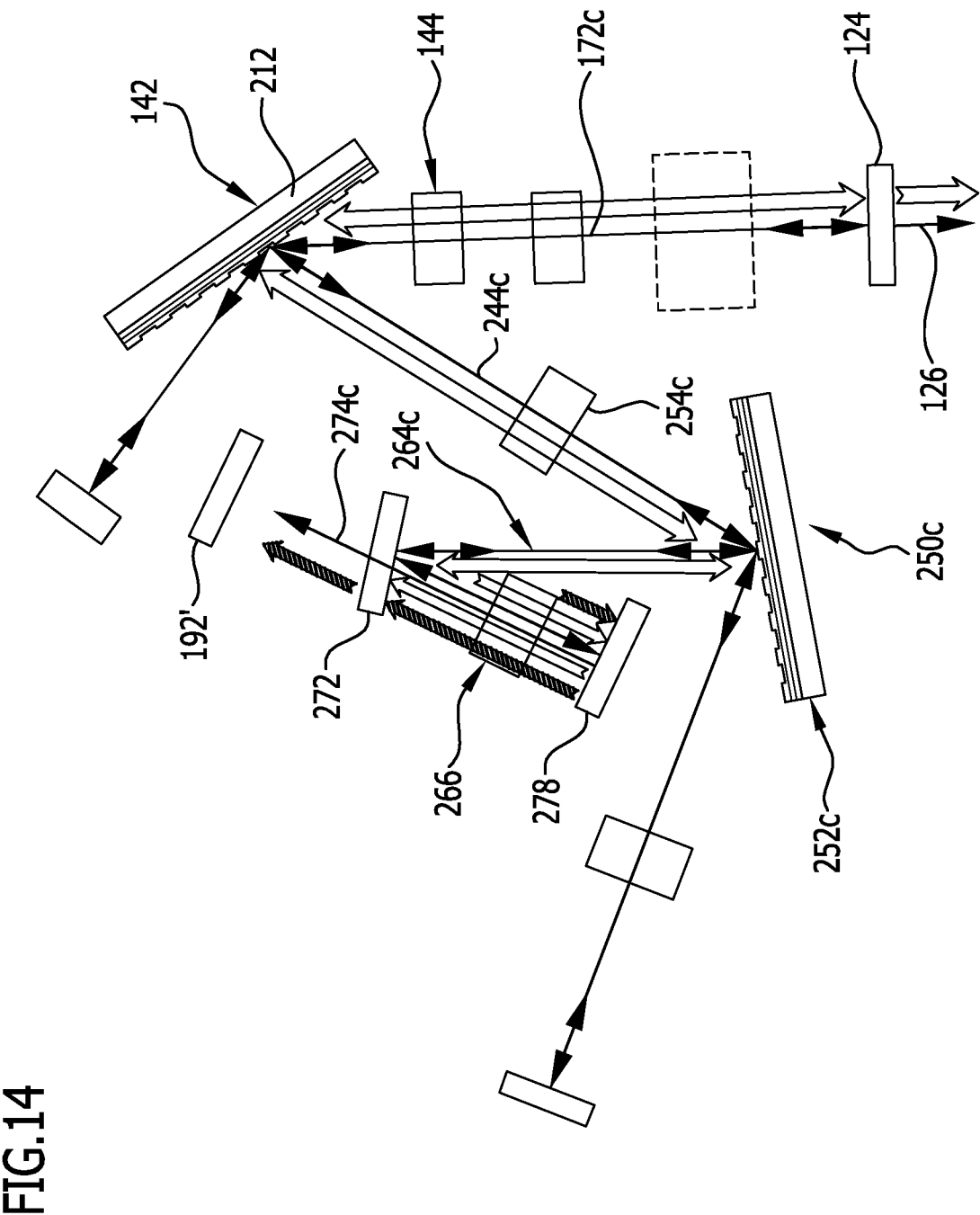
FIG. 14 shows a propagation of a radiation field in optical unit of FIG. 11 for yet another operation condition.

Differently to the previous embodiment, in the other supplementary arm, for example in supplementary arm 244c, another optical switching arrangement 250c is provided which comprises a selective response device 252c and a setting device 254c, as exemplarily shown in FIGS. 11, 13, 14.

In particular, selective response device 252c is designed to redirect an incident radiation field depending on a characteristic property of the radiation field, for example its polarization, and comprises therefor a deflection element, which for example is a grating mirror, and for further details thereof it is referred fully to the explanations given above for such a selective response device.

The setting device 254c is configured for setting the characteristic property of the radiation field to which the selective response device 252c is selective to. For example, setting device 254c comprises a polarization switching element, and for further details it is referred to the explanations given above in connection with the previous embodiments.

With the optical switching arrangement 250c the supplementary arm, here supplementary arm 244c, is bifurcated further into two different supplementary arms 262c and 264c, which are designed for different operation conditions.

In particular, one of these supplementary arms, for example supplementary arm 262c, as exemplarily shown in FIGS. 11 and 13, realizes conditions for continuous wave operation and in particular comprises an end mirror with supplementary arm 262c being defined between this end mirror and the optical switching arrangement 250c.

Therefore, the optical unit 110c is configured along this supplementary arm 262c together with the supplementary arm 244c between the two switching arrangements 250c and 150 and the main arm 172c for continuous wave operation.

For example, in some variants of the embodiment in this supplementary arm 262c, a pulse generating device 232 is provided, which is in particular configured for generating short pulses. Therefore, in these variants this supplementary arm is configured for both, continuous wave operation and pulse operation and regarding further details of this pulse generating device and a supplementary arm comprising the same it is referred to the explanations given above in connection with the previous embodiments.

In other variants of the embodiment, there is no pulse generating device in this supplementary arm 262c, which therefore in particular solely realizes continuous wave operation conditions.

The other supplementary arm, here supplementary arm 264c, is configured for still another operation condition, here for a frequency conversion operation condition, as exemplarily shown in FIGS. 11 and 14.

Therefore, in this supplementary arm 264c a frequency conversion device 266 is provided.

For example, the frequency conversion device 266 comprises a frequency conversion medium within which the radiation field is exposed to nonlinear processes which convert the frequency of portions of the radiation field.

In particular, in this supplementary arm 264c another outcoupling element 272 is provided, at which optical path 114c is connected to another outgoing optical path 274 for providing the frequency converted portion of the radiation field. In particular this outcoupling element 272 keeps non-converted portions of the radiation field within the optical unit 110c.

For example, within this supplementary arm 264c another reflector 278 is provided and the frequency conversion device 266 is provided between the reflector 278 and the outcoupling element 272.

Exemplarily, the frequency conversion operation within this radiation field generating system 100c is exemplarily shown in FIG. 14.

Optical switching arrangement 150 is set for this condition to direct the propagating radiation field to supplementary arm 244c, which comprises the additional optical switching arrangement 250c, the setting device 254c of which sets the characteristic property, here the polarization, of the radiation field such that the selective response device 252c with its deflection element directs the propagating radiation field into supplementary arm 264c with the frequency conversion device 266.

Under this condition the radiation field propagates through frequency conversion device 266 and at least a portion of the radiation field is frequency converted and this portion is coupled out by outcoupling element 272, whereas the remaining portion of the radiation field propagates back along supplementary arm 264c to supplementary arm 244c and the main arm 172c.

For example, the radiation field is directed by the optical switching arrangement 250c into supplementary arm 264c, where it propagates towards the outcoupling element 272 which is for example reflective for the unconverted radiation field and the incident radiation field coming from the optical switching arrangement 250c is reflected and directed towards the frequency conversion device 266 at which a portion of the radiation field is frequency converted. The frequency converted portion and the unconverted portion of the radiation field then propagate towards the reflector 278 and are reflected back to the frequency conversion device 266 at which for example another portion is converted and the frequency converted portions and unconverted portions of the radiation field further propagate to the outcoupling element 172 at which the frequency converted portions are coupled out to the outgoing path 274c and the unconverted portion of the radiation field is reflected back to the optical switching arrangement 250c and from there propagates further along supplementary arm 244c to switching arrangement 150 into main arm 172c.

For a different setting of the characteristic property of the radiation field, in particular its polarization, by the setting device 254c in the supplementary arm 244c the radiation field, which propagates along supplementary arm 244c towards the selective response device 252c, is redirected by the selective response device 252c, in particular its deflection element 212, into the other supplementary arm, here supplementary arm 262c. After propagating through supplementary arm 262a, the radiation field propagates back into supplementary arm 244c and main arm 172c. The optical unit 110c is then operated under continuous wave operation condition or pulse operation condition, as explained above. This configuration is exemplarily shown in FIG. 13.

In other variants of the embodiment, there is no further pulse generating device in supplementary arm 262c, and this supplementary arm realizes solely continuous wave operation conditions.

For the setting device 144 in the main arm 172c setting the characteristic property, here the polarization, of the radiation field to the other value, the selective response device 142 with its deflection elements 212 directs the incident radiation field which propagates along the main arm 172c into the supplementary arm 242c from where the radiation field propagates back into the main arm, as exemplarily shown in FIG. 12. In this case, the optical unit 110c operates under the operation for which supplementary arm 242c is configured, here for the pulsed operation conditions, in particular for providing ultra-short pulses by pulse generating device 226, which in particular comprises a saturable absorber 228.

For further details of the operation under these conditions it is fully referred to the explanations given above in connection with the previous embodiments.

In particular, the optical unit 110c comprises a controller 182 which is connected to the two switching arrangements 150 and 250c, in particular their setting devices 144 and 254c, and for example to the amplifying component 121 and/or pulse generating devices 226 and/or 232. For sake of clarity, controller 182 is only shown in FIG. 11.

A user is able to input desired operation conditions and/or sequences of operation conditions to controller 182 and controller 182 controls the optical unit 110c in accordance with the input.

The radiation field generating system 100c of this embodiment comprises for example in some variants an amplifying unit 192 for the outgoing radiation field along outgoing path 126 and/or an amplifying unit 192' for outgoing frequency converted radiation field along outgoing path 274c. These amplifying units 192, 192' can be a single amplifier and/or a cascade of amplifiers, and for the explanation it is fully referred to the explanations given above.

In particular, the provided radiation fields by optical unit 110c are further provided for applications, in particular to material processing applications.

The different designs of the single supplementary arms are interchangeable, such that a supplementary arm described in connection with one embodiment can be similarly employed to an optical assembly of another embodiment described above.

In particular, also for the embodiments of radiation field amplifying systems 100, 100a, 100b a supplementary arm of these can be provided to be configured for frequency conversion operation conditions and/or a supplementary arm of these embodiments can also have another optical switching arrangement for providing additional operation conditions, for example frequency conversion operation conditions.

In another embodiment, not exemplarily shown in a figure, a production machine, in particular for material processing, comprises a radiation field generating system according to one of the above-described embodiments.

In this production machine the provided radiation field, in particular a laser, in the different operation conditions can be used within the production process, in particular for processing material, the material processing in particular comprising welding and/or cutting and/or surface structuring and/or laser ablation and/or stimulating and controlling of chemical processes.

LIST OF REFERENCE NUMERALS (WITHOUT SUFFIXES DESIGNATING AN EMBODIMENT)

100 Radiation field generating system
110 optical unit
112 optical assembly
114 optical path within optical unit
121 laser amplifying component
122 laser active medium
123 pumping device
124 outcoupling element
126 outgoing optical path
142 selective response device
144 setting device
150 optical switching arrangement
152 saturable absorber medium
154 reflector
156 deformable mirror
158 reflection surface
162 section of optical path
166 radiation field shaping element
170 optical compensation arrangement
172 main arm
173 section of optical path
174 section of optical path
178 reflection surface
182 controller
186 optical elements
192 amplifying unit
208 polarization switching element
212 deflection element
214 reflector
216 substrate
218 grating/diffraction structure
222 supplementary arm
226 pulse generating device
228 saturable absorber
232 pulse generating device
242 supplementary arm
244 supplementary arm
250 optical switching arrangement
252 selective response device
254 setting device
262 supplementary arm
264 supplementary arm 266 frequency conversion device
272 outcoupling element
274 outgoing path
278 reflector

What is claimed is:

1. A radiation field generating system comprising an optical unit with an optical assembly which defines an optical path, wherein the optical unit is operable in several different operation conditions and the optical assembly comprises at least one optical switching component with which switching between at least two different operation conditions of the several operation conditions can be performed.

2. The radiation field generating system according to claim 1, wherein the several operation conditions comprise one pulsed operation condition or several pulsed operation conditions.

3. The radiation field generating system according to claim 1, wherein the several operation conditions comprise at least one of the group of at least one pulsed operation condition which is configured to generate ultra-short pulses and/or at least one mode-locked operation condition and/or at least one continuous wave operation condition and/or at least one frequency conversion operation condition.

4. The radiation field generating system according to claim 1, wherein the at least one optical switching component switches between the at least two different operation conditions based on at least one characteristic property of the radiation field which propagates along the optical path.

5. The radiation field generating system according to claim 4, wherein the at least one characteristic property of the radiation field is one property or are several properties of at least a polarization and/or a property of a shape and/or a fluence of the radiation field.

6. The radiation field generating system according to claim 1, wherein the at least one switching component comprises a setting device for setting an at least one characteristic property of the radiation field based on which the switching between at least two different operation conditions is performed.

7. The radiation field generating system according to claim 6, wherein the setting device comprises one radiation field shaping element or several radiation field shaping elements.

8. The radiation field generating system according to claim 6, wherein the setting device comprises at least one polarization switching element.

9. The radiation field generating system according to claim 1, wherein the at least one optical switching component comprises at least one selective response device responding selectively on the radiation field depending on an at least one characteristic property of the radiation field.

10. The radiation field generating system according to claim 9, wherein the at least one characteristic property of the radiation field is one property or are several properties of at least a polarization and/or a property of a shape and/or a fluence of the radiation field.

11. The radiation field generating system according to claim 9, wherein the at least one selective response device comprises at least one saturable absorber.

12. The radiation field generating system according to claim 9, wherein the at least one selective response device comprises at least one deflection element, which deflects the radiation field depending on the at least one characteristic property of the radiation field into different directions.

13. The radiation field generating system according to claim 9, wherein at least one selective response device is a diffraction mirror.

14. The radiation field generating system according to claim 9, wherein at least one selective response device is a deflection element which is used in Littrow condition.

15. The radiation field generating system according to claim 1, wherein the optical path within the optical unit comprises a main arm along which the radiation field propagates for each of the several operation conditions.

16. The radiation field generating system according to claim 1, wherein the optical path within the optical unit comprises a main arm and along the main arm at least one of the several operation conditions is realized.

17. The radiation field generating system according to claim 1, wherein the optical path comprises within the optical unit a single arm, along which the several operation conditions are realized.

18. The radiation field generating system according to claim 1, wherein along at least two different arms of the optical path at least two different operation conditions are realized within the optical unit.

19. The radiation field generating system according to claim 1, wherein the optical path comprises at least one supplementary arm bifurcating from the main arm and along the at least one supplementary arm at least one of the several operation conditions is realized.

20. The radiation field generating system according to claim 19, wherein at least one supplementary arm bifurcates in another supplementary arm.

21. The radiation field generating system according to claim 1, wherein along at least one arm of the optical path at least two different operation conditions are realized.

22. The radiation field generating system according to claim 1, wherein the optical path within the optical unit comprises for each respective operation condition a respective supplementary arm.

23. The radiation field generating system according to claim 1, wherein the optical assembly comprises one pulse generating component or several pulse generating components.

24. The radiation field generating system according to claim 1, wherein a selective response device comprises at least one pulse generating component.

25. The radiation field generating system according to claim 1, wherein at least one pulse generating component for generating ultrashort pulses and at least one pulse generating component for generating short pulses are provided in different arms of the optical path.

26. The radiation field generating system according to claim 1, wherein the optical unit comprises at least one frequency conversion device.

27. The radiation field generating system according to claim 1, wherein the optical unit is built as a resonator.

28. The radiation field generating system according to claim 1, wherein the optical assembly comprises an optical compensation arrangement to provide at least one of at least with respect to resonant conditions for certain modes of the radiation field uniform conditions along at least a part of the optical path and/or an at least with respect to its shape uniform radiation field along at least a part of the optical path.

29. The radiation field generating system according to claim 1, wherein an optical compensation arrangement comprises one radiation field shaping element or several radiation field shaping elements.

30. The radiation field generating system according to claim 1, wherein an optical compensation arrangement comprises at least one adaptable radiation field shaping element.

31. The radiation field generating system according to claim 1, wherein an optical switching arrangement and an optical compensation arrangement are integrated in one optical adjustment component.

32. The radiation field generating system according to claim 1, wherein the radiation field generating system comprises at least one amplifying unit in addition to the optical unit.

33. A production machine for material processing, the production machine comprising the radiation field generating system according to claim 1.

* * * * *